United States Patent
Ohashi et al.

(10) Patent No.: US 10,611,404 B2
(45) Date of Patent: Apr. 7, 2020

(54) DAMPER DEVICE AND STEERING DEVICE

(71) Applicants: JTEKT CORPORATION, Osaka-shi, Osaka (JP); NOK CORPORATION, Tokyo (JP)

(72) Inventors: Tatsuya Ohashi, Okazaki (JP); Yuki Hanada, Saihaku-gun (JP)

(73) Assignees: JTEKT CORPORATION, Osaka (JP); NOK CORPORATION, Tokyo (JP)

( * ) Notice: Subject to any disclaimer, the term of this patent is extended or adjusted under 35 U.S.C. 154(b) by 524 days.

(21) Appl. No.: 15/331,686

(22) Filed: Oct. 21, 2016

(65) Prior Publication Data
US 2017/0113718 A1    Apr. 27, 2017

(30) Foreign Application Priority Data

Oct. 22, 2015 (JP) .................. 2015-208058
Oct. 22, 2015 (JP) .................. 2015-208059
(Continued)

(51) Int. Cl.
*B62D 7/22*        (2006.01)
*B62D 3/12*        (2006.01)
(Continued)

(52) U.S. Cl.
CPC .............. *B62D 7/228* (2013.01); *B62D 3/12* (2013.01); *B62D 7/163* (2013.01); *F16F 1/3732* (2013.01);
(Continued)

(58) Field of Classification Search
CPC .......... F16F 1/3732; F16F 1/445; B62D 7/228
See application file for complete search history.

(56) References Cited

U.S. PATENT DOCUMENTS 7,258,035 B2 *  8/2007  Bieber .................... B62D 3/12
                                                                    180/78
8,616,565 B1 * 12/2013  Delorenzis ............ B62D 7/144
                                                                    280/86.5
(Continued)

FOREIGN PATENT DOCUMENTS

DE       102007000680 A1    5/2009
DE    10 2011 051 715 A1    1/2013
(Continued)

OTHER PUBLICATIONS

Oct. 5, 2017 Office Action issued in U.S. Appl. No. 15/331,735.
(Continued)

*Primary Examiner* — Howard J Sanders
*Assistant Examiner* — Gregory T Prather
(74) *Attorney, Agent, or Firm* — Oliff PLC

(57) ABSTRACT

The damper device includes the shaft, the large diameter portion housing and the impact absorbing member. When the large diameter portion does not apply an impact force on the flange portion, the elastic body is disposed at one of the inner peripheral surface of the housing and the outer peripheral surface of the cylindrical portion having a gap and when the large diameter portion applies the impact force on the flange portion, the elastic body is deformed in an axial direction to be deformed and is brought into contact with all of the inner peripheral surface of the housing, the restricting surface, the outer peripheral surface of the cylindrical portion and the flange portion. The impact receiving member is restricted from a relative movement relative to the housing by the deformed elastic body and the impact receiving member keeps a non-contact state with the housing.

20 Claims, 20 Drawing Sheets

(30) Foreign Application Priority Data

Oct. 22, 2015 (JP) ................................ 2015-208060
Oct. 22, 2015 (JP) ................................ 2015-208061

(51) Int. Cl.

| | |
|---|---|
| *B62D 7/16* | (2006.01) |
| *F16F 1/373* | (2006.01) |
| *F16F 1/44* | (2006.01) |
| *B62D 5/04* | (2006.01) |

(52) U.S. Cl.

CPC .......... *F16F 1/445* (2013.01); *B62D 5/0421* (2013.01); *B62D 5/0448* (2013.01)

(56) References Cited

U.S. PATENT DOCUMENTS

| | | | |
|---|---|---|---|
| 2004/0216548 A1 | 11/2004 | Bieber | |
| 2005/0167182 A1 | 8/2005 | Abe et al. | |
| 2007/0267894 A1* | 11/2007 | Van Den Brink | B62D 33/0604 296/190.07 |
| 2015/0151787 A1* | 6/2015 | Ohashi | B62D 7/163 280/93.511 |
| 2016/0052539 A1 | 2/2016 | Ueno et al. | |
| 2016/0084334 A1* | 3/2016 | Myers | F16F 1/3732 267/113 |
| 2017/0113718 A1* | 4/2017 | Ohashi | B62D 3/12 |
| 2017/0113719 A1* | 4/2017 | Ohashi | B62D 3/12 |
| 2017/0267282 A1* | 9/2017 | Ogata | B62D 3/12 |
| 2018/0334187 A1* | 11/2018 | Kato | B62D 7/228 |

FOREIGN PATENT DOCUMENTS

| | | |
|---|---|---|
| EP | 1 777 138 B1 | 3/2010 |
| EP | 2733048 A2 | 5/2014 |
| EP | 2881304 A1 | 6/2015 |
| GB | 2524604 A | 9/2015 |
| JP | 2007-263154 A | 10/2007 |
| JP | 2009-090788 A | 4/2009 |
| JP | 4255832 B2 | 4/2009 |
| JP | 2012-035713 A | 2/2012 |
| JP | 2013-023154 A | 2/2013 |
| JP | 2015-063157 A | 4/2015 |
| JP | 2015-128981 A | 7/2015 |
| JP | 2017-002935 A | 1/2017 |
| WO | 03029067 A1 | 4/2003 |
| WO | 2005/028284 A1 | 3/2005 |
| WO | 2005/123484 A1 | 12/2005 |

OTHER PUBLICATIONS

Feb. 24, 2017 Search Report issued in European Patent Application No. 16195034.0.
U.S. Appl. No. 15/331,735, filed Oct. 21, 2016 in the name of Ohashi et al.
Feb. 24, 2017 Search Report issued in European Patent Application No. 16195031.6.
Apr. 16, 2019 Office Action issued in Japanese Patent Application No. 2015-208059.
Apr. 16, 2019 Office Action issued in Japanese Patent Application No. 2015-208060.

\* cited by examiner

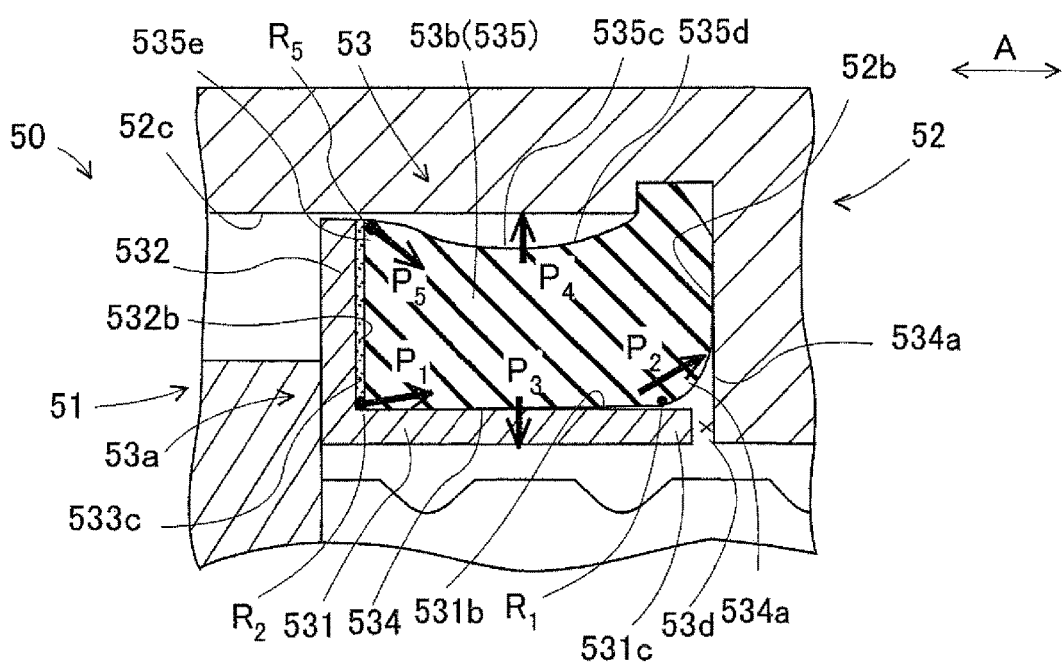

DAMPER DEVICE AND STEERING DEVICE

INCORPORATION BY REFERENCE

This application is based on and claims priority under 35 U.S.C. 119 with respect to Japanese Applications Nos. JP2015-208058, JP2015-208059 JP2015-208060 and JP2015-208061 filed on Oct. 22, 2015, the entire content of which is incorporated herein by reference.

BACKGROUND OF THE INVENTION

Field of the Invention

This invention relates to a damper device and a steering device which uses the damper device.

Description of Related Art

A steering device used for a vehicle changes the direction of a steered wheel (tire) by reciprocally moving a rack shaft which is connected to the vehicle wheel in an axial direction through a tie rod. The rack shaft is slidably accommodated in a housing. The rack shaft is structured such that the reciprocal movement range of the rack shaft is physically restricted upon reaching to the limit of a reciprocal movement range by the collision of the large diameter portion formed at the end of the rack shaft with the housing. In more detail, accompanied by the operation of the steering wheel by a driver of the vehicle, the force which moves the rack shaft in an axial direction (forward force) is inputted. Vice versa, such as for example, due to an operation of the steered wheel being running on to a curbstone, an excessive force from the steered wheel towards the rack shaft is inputted. Such excessive force moves the rack shaft in an axial direction (reverse force). Accompanied by the input of the forward or reverse force, when the rack shaft moves in an axial direction until it collides with the housing, a so-called "end abutting" occurs.

In a steering device, a damper device is provided at the end abutting portion to absorb or dampen the impact generated upon end abutting operation. As a damper device, a device has been known which includes a rack shaft with a large diameter portion, a housing through which the rack shaft is inserted and is relatively slidably movable in an axial direction but restricts the axial movement of the large diameter portion of the rack shaft and an impact absorbing member inserted into a shaft portion of the rack shaft and is disposed in an axis line direction between the end surface of the large diameter portion and the housing.

The steering device according to the Patent Literature 1 includes an elastic body (impact absorbing member) disposed between the end member (large diameter portion) and the housing. The impact absorbing member absorbs the collision impact receiving the impact through the large diameter portion when the large diameter portion collides with the housing. The impact absorbing member includes an end plate (impact receiving member) which receives the collision impact upon contacting with the large diameter portion. The impact receiving member is formed with a restricting portion which contacts with a predetermined portion of the housing. In the Patent Literature 2, an impact absorbing member (damping member) is disclosed, which has an annular plate shaped restricting portion (stopper member) as similar to that disclosed in the Patent Literature 1

LIST OF RELATED ART

Patent Literature

[PATENT LITERATURE 1]: JP 2015-128981 A
[PATENT LITERATURE 2]: JP2015-63157 A

DISCLOSURE OF INVENTION

Problems to be Solved by the Invention

However, the damper device according to the Patent Literatures 1 and 2, the structure that the restricting portion is in contact with a predetermined portion of the housing is a prerequisite. The impact absorbing member is displaced in an axial direction when a predetermined force is applied. The restricting portion stops the displacement of the impact absorbing member by the contact with the housing. Thus, the compression displacement of the elastic body of the impact absorbing member is restricted in a certain range and an advantageous effect that a durability of the elastic body is assured can be achieved. Normally, the restricting portion and the housing are formed by a metal material. Thus, when the collision force received by the impact absorbing member is excessively great, the restricting portion and the housing are momentarily brought into contact with a large force and a collision impact of metal to metal is generated. This may damage the rack shaft or the weakest part of the portions which are connected to the housing and accordingly, it is necessary to improve the load resistance performance of the weakest part not to be damaged by the impact force, even the cost increases.

The present invention has been made considering the above issues and it is an object of the present invention to provide a damper device and a steering device which can be manufactured with less cost by adopting a structure which has no contact between metal formed parts.

Means to Solve the Problems

The damper device according to the invention includes a shaft having a shaft portion and a large diameter portion, a housing formed in a cylindrical shape and through which the shaft is inserted to be relatively slidably movable in an axial direction, the housing being provided with a restricting surface facing to an end surface of the large diameter portion in the axial direction and an impact absorbing member inserted onto the shaft portion and disposed between the end surface of the large diameter portion and the restricting surface in the axial direction, wherein the impact absorbing member includes an impact receiving member including a cylindrical portion facing to an inner peripheral surface of the housing and a flange portion extending from the cylindrical portion outwardly in a radial direction and facing to the restricting surface and being contactable with the large diameter portion and an elastic body provided in a space formed by the inner peripheral surface of the housing, the restricting surface, an outer peripheral surface of the cylindrical portion and the flange portion and formed by a rubber material or a synthetic resin material having a rubber-like elasticity.

When the large diameter portion does not apply an impact force on the flange portion, the elastic body is disposed at least at one of the inner peripheral surface of the housing and the outer peripheral surface of the cylindrical portion having a gap, when the large diameter portion applies the impact force on the flange portion, the elastic body is compressed by the restricting surface and the flange portion in the axial direction and deformed to be brought into contact with all of the inner peripheral surface of the housing, the restricting surface, the outer peripheral surface of the cylindrical portion and the flange portion so that the gap is filled with the elastic body; and wherein, the impact receiving member is restricted from a relative movement relative to the housing by the deformed elastic body under the impact receiving member being kept to be a non-contact state relative to the restricting surface.

The steering device according to the present invention provided with the damper device of the present invention. The steering device includes a rack shaft as the shaft portion of the damper device, the rack shaft being connected to steered wheels (steered wheels to be steered for turning the vehicle) via tie rods at both ends thereof and being reciprocally movable in an axial direction to turn the steered wheels and large diameter portions provided at both ends of the rack shaft as the large diameter portion of the damper device, to which the tie rods are pivotally connected and a housing for accommodating the rack shaft as the housing of the damper device.

According to the damper device or the steering device of the present invention, when the large diameter portion does not apply the impact force on the flange portion, i.e., under the state before the elastic body starts to be deformed, a gap is provided between the elastic body and at least at one of the inner peripheral surface of the housing and the inner peripheral surface of the cylindrical portion. When the large diameter portion applies the impact force on the flange portion, the elastic body is compressed to be deformed to thereby lessen the volume of the gap. Finally, the gap is filled up with the deformed elastic body.

Until before the elastic body is filled in the gap, due to the rubber like elasticity characteristics of the elastic body, the impact absorbing force is demonstrated. After the state that the gap has been finally filled with the elastic body, the elastic body is deformed so that the restricting surface, the flange portion, the inner peripheral surface of the housing and the outer peripheral surface of the cylindrical portion are all brought into contact with the elastic body. Thus, by the contact of the elastic body with all four outer surfaces thereof in vertical cross section, the rigidity of the elastic body becomes too large to deform the elastic body furthermore. In other words, by utilizing the change of the rigidity of the elastic body, the movement of the impact receiving member relative to the restricting surface of the housing can be restricted.

Under the state that the relative movement of the impact receiving member is restricted, the impact receiving member keeps the non-contact state with the restricting surface. The elastic body keeps continuing the state of non-contact with the restricting surface. In other words, keeping the non-contact state between the impact receiving member and the housing, the elastic body can continue to be disposed between the housing and the large diameter portion. Under the state that the relative movement of the impact receiving member is restricted, the rigidity of the elastic body becomes increased and by this increase of the rigidity, the impact force to be transmitted to each component of the device increases as well. However, compared to the increase ratio of the transmitted impact force where the relative movement of the impact receiving member by the contact between the impact receiving member and the housing, the increase ratio of the impact force according to the structure of the present invention is small. (Hereinafter, the effect of reducing the increase ratio of the impact force transmitted to each component of the device is referred to simply as "impact transmission suppression effect"). Accordingly, the load resistance performance of each component of the device can be lessened and as a result, the cost of manufacturing the device can be reduced.

In this specification, the "elastic body" indicates any member formed by a material which expresses "rubber like elasticity" as defined in general and any member within this meaning should not be excluded. As such elastic body, a rubber material or a synthetic resin having a rubber like elasticity can be preferably used.

BRIEF DESCRIPTION OF THE ATTACHED DRAWINGS

Various aspects of this invention will become apparent to those skilled in the art from the following detailed description of the preferred embodiments, when read in light of the accompanying drawings, in which:

FIG. 9 is a view explaining the impact absorbing member during the compression operation after the end abutting operation;

DETAILED DESCRIPTION OF THE PREFERRED EMBODIMENTS OF THE INVENTION

First Embodiment

Figure 1:
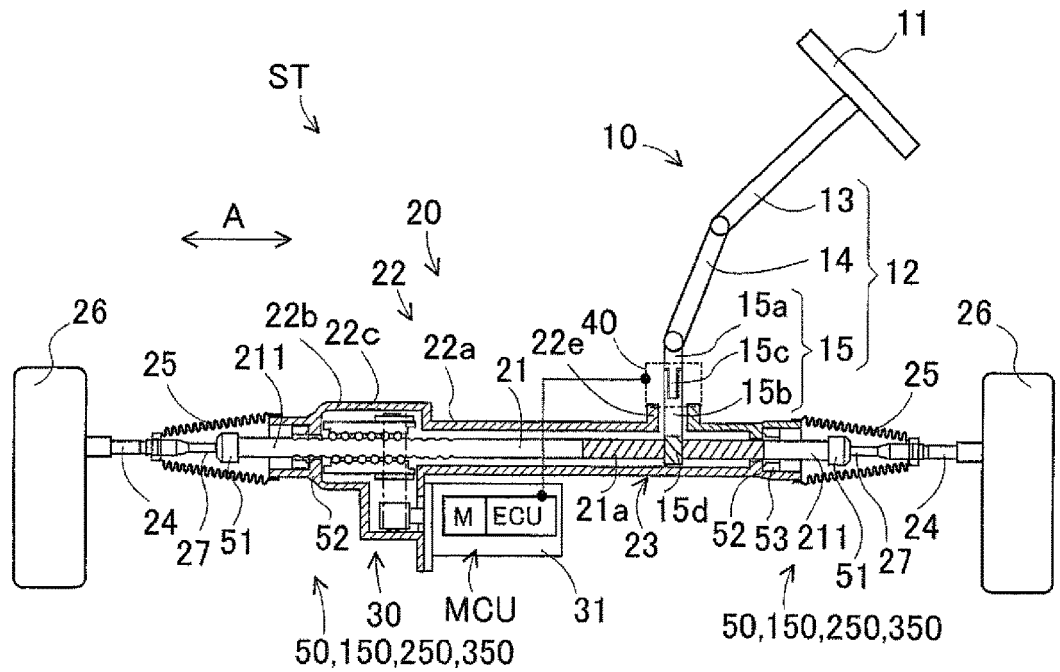
FIG. 1 is a conceptual view of the entire electric power steering device according to an embodiment of the invention.

Hereinafter, a damper device according to the first embodiment of the present invention will be explained based on a steering device according to the present invention in which the damper device is used with reference to the attached drawings. As an example of the steering device, an electric power steering device will be explained. The electric power steering is a steering device which assists the steering power by steering assist force. As the steering device according to the invention, in addition to the electric power steering device, rear wheel steering device and steer-by-wire device can be applicable. In FIG. 1, the steering device ST includes a steering mechanism 10, a turning mechanism 20, a steering assist mechanism 30, a torque detecting device 40 and a damper device 50.

1-1. Structure of Electric Power Steering Device

As indicated in FIG. 1, the steering mechanism 10 includes a steering wheel 11 and a steering shaft 12. The steering wheel 11 is fixed to an end portion of the steering shaft 12. The steering shaft 12 transmits a steering torque applied to the steering wheel 11 for turning the steered wheels 26. The steering shaft 12 is formed by connecting a columnar shaft 13, an intermediate shaft 14 and a pinion shaft 15. The pinion shaft 15 includes an input shaft 15a, an output shaft 15b and a torsion bar 15c. An input side portion of the input shaft 15a is connected to an output side portion of the intermediate shaft 14. A pinion gear 15d is formed at an output side portion of the output shaft 15b.

The turning mechanism 20 includes a rack shaft 21 and a housing 22 formed substantially of a cylindrical shape. The rack shaft 21 is accommodated in the housing and supported thereby for reciprocally movable in a straight line along in an A-axis direction (corresponding to an axial direction). The housing 22 includes a first housing 22a and a second housing 22b fixed to the first housing 22a at the left side as viewed in FIG. 1 along in the A-axis direction.

The pinion shaft 15 is rotatably supported in the first housing 22a. The rack shaft 21 is provided with a rack gear 21a and the rack gear 21a and the pinion gear 15d are mutually in mesh with each other to form a rack and pinion mechanism 23. The rack and pinion mechanism 23 is accommodated in the first housing 22a.

The rack shaft 21 includes a pair of large diameter portions 51, 51 at both ends of a shaft portion 211. The pair of large diameter portions 51, 51 is formed by enlarging the diameter of the shaft portion 211 at both ends of the rack shaft 21. A pair of ball studs 27, 27 is accommodated in the pair of large diameter portions 51, 51 to form a ball joint. A pair of tie rods 24, 24 is connected to each end portion of the ball studs 27, 27 and each tip end of the tie rods 24, 24 is connected to a knuckle (not shown) to which the steered wheels 26, 26 are assembled. Thus, when the steering wheel 11 is steered, the steering torque is transmitted to the steering shaft 12 and then the pinion shaft 15 is rotated. The rotation of the pinion shaft 15 is converted into the straight line reciprocal movement of the rack shaft 21 by the engagement of the pinion gear 15d and the rack gear 21a. This reciprocal movement in the A-axis direction is transmitted to the knuckles via the tie rods 24, 24. Thus, the steered wheels 26, 26 are turned to change the running direction of the vehicle. It is noted here that the numeral 25 indicates a boots for keeping the accommodation space of the turning mechanism 20 including the inside of the housing 22 to be in air-tight condition.

A pair of impact absorbing members 53, 53, which will be explained later in detail, is provided at both ends of the housing 22. The pair of impact absorbing members 53, 53 is accommodated in a pair of large diameter portion housings 52, 52, one formed at one end side portion of the first housing 22a and the other formed at the other side end portion of the second housing 22b and is attached to a pair of restricting surfaces 52b, 52b. The impact absorbing members 53, 53 are disposed between the large diameter portions 51, 51 and the restricting surfaces 52b, 52b facing to the large diameter portions 51, 51. The large diameter portions 51, 51 restrict the straight line movement of the rack shaft 21 in the axial direction. When the rack shaft 21 moves along in the A-axis direction and the steered wheels 26, 26 reach the maximum steerable angle, an "end butting" operation where the large diameter portion 51 collides with the impact absorbing member 53 occurs. The impact of the collision is absorbed by the impact absorbing member 53.

Figure 2:
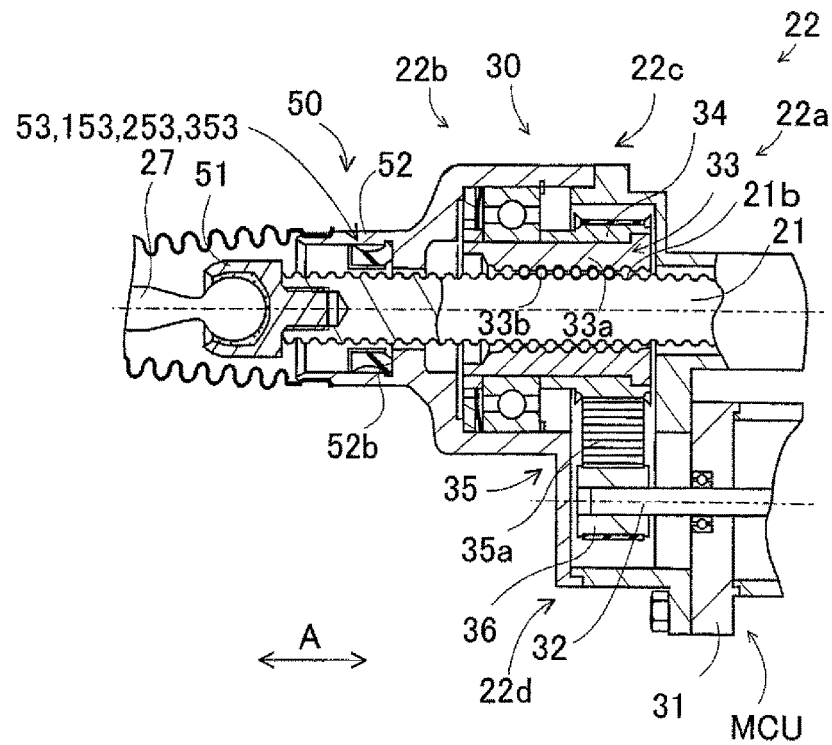
FIG. 2 is a cross sectional view of the structure of the damper device according to a first embodiment.

The steering assist mechanism 30 is a mechanism which applies a steering assist force to the steering mechanism 10 by a motor M, as a driving source, which is controlled based on the output of the torque detecting device 40. As shown in FIG. 2, the steering assist mechanism 30 includes a housing 22c for steering assist device, a swelling portion 22d, a housing 31 for an electric equipment, an MCU (Motor Control Unit), a ball screw mechanism 33 and a driving force transmitting mechanism 35. It is noted here that the steering device ST of this embodiment is structured as a so-called rack parallel type steering device.

The steering assist mechanism 30 transmits the rotation torque of the motor M to the ball screw mechanism 33 via the driving force transmitting mechanism 35 and by this ball screw mechanism 33, the rotation torque is converted into a travelling force of the straight line reciprocal movement to thereby apply the steering assist force. (See FIGS. 1 and 2).

The housing 22c for the steering assist device is provided at the adhesion portion between the first housing 22a and the second housing 22b, The housing 22c for the steering assist device is of a cylindrical shape and is formed by extending the diameters of each facing end portion of the first and the second housings 22a and 22b, The housing for the steering assist device accommodates mainly a portion of the ball screw mechanism 33 of the steering assist mechanism 30 therein. The swelling portion 22d which is of a cylindrical shape extending from the housing 22c is arranged lower side of the housing 22c for the steering assist device. The housing 22c for the steering assist device and the swelling portion 22d form a continuing one accommodation space therein. The housing 31 for the electric equipment is attached to the one end surface of the swelling portion 22d and accommodates therein the electric equipment MCU. The swelling portion 22d and the housing 31 for the electric equipment are in communication through a through-hole provided therebetween.

The electric equipment MCU accommodated in the electric equipment housing 31 includes the motor M and a control portion ECU for driving the motor M. The output shaft 32 of the motor M is in parallel with the rack shaft 21 in an axial direction. The output shaft 32 is provided so that a tip end of the shaft is extended into the swelling portion 22d. The output shaft 32 serves as an output shaft of the motor M and transmits the steering assist force. The drive pulley 36 is inserted into the outer peripheral surface of the tip end portion of the output shaft 32 arranged in the swelling portion 22d.

The ball screw mechanism 33 includes a ball screw portion 21b and a ball screw nut 33a. The ball screw portion 21b is formed on the outer periphery of the rack shaft 21 within a predetermined range thereof in the A-axis direction (See left side in FIG. 1). The ball screw nut 33a is engaged with the ball screw portion 21b of the rack shaft 21 via a plurality of balls arranged along the ball screw portion 21b.

The driving force transmitting mechanism 35 is formed by the drive pulley 36, a geared belt 35a and a driven pulley 34. The drive pulley 36 and the driven pulley respectively have the outer teeth thereon. The driving force transmitting mechanism 35 transmits the rotational driving force which is generated by the motor M between the drive pulley 36 and the driven pulley 34. The drive pulley 36 performs the rotational torque transmission via the output shaft 32. The geared belt 35a is made from a rubber material and this is the weakest point in strength among the components of the steering device ST.

The driven pulley 34 having the outer teeth is fixed to the outer periphery of the ball screw nut 33a integrally formed therewith for a unit rotation. The geared belt 35a is formed in an annular shaped rubber belt having a plurality of inner teeth at an inner periphery side. The geared belt 35a is bridged over between the outer periphery of the driven pulley 34 and the outer periphery of the drive pulley 36 under the engagement state with respective outer teeth provided on each outer periphery of the driven and drive pulleys 36 and 34. Further, the geared belt 35a transmits the rotation of the geared drive pulley 36 to the geared driven pulley 34 without any slidable operation.

According to the structure explained above, the steering assist mechanism 30 drives the motor M in response to the rotation operation of the steering wheel 11 to rotate the output shaft 32. By the rotation of the output shaft 32, the rotation torque is transmitted to the drive pulley 36 to rotate the drive pulley. The rotation of the drive pulley is transmitted to the driven pulley 34 via the geared belt 35a to rotate the driven pulley 34. By the rotation of the driven pulley 34, the ball screw nut 33a, which is formed integrally with the driven pulley 34, is rotated. By the rotation of the driven pulley 34, the ball screw nut 33a which is formed integrally with the driven pulley 34 is rotated. By the rotation of the ball screw nut 34a, the steering assist force is transmitted to the rack shaft 21 in the A-axis direction of the rack shaft 21 via the balls 33b.

It is noted here that when the rack shaft 21 suddenly stops the movement thereof, the rotational movements of the ball screw nut 33a and the driven pulley 34 are stopped. On the other hand, the rotation of the drive pulley 36 and the output shaft 32 of the motor M continues by the inertia. Then, the tension of one of the belts of the geared belt 35a bridged over the driven and drive pulleys is excessively increased to loosen the tension of the other of the belts. Accordingly, the number of engaging teeth between the inner teeth of the loosen side belt and the outer teeth of the drive pulley 36 is reduced (tooth lifting) and the inner teeth of the geared belt 35a may be disengaged (tooth jumping) from the outer teeth of each pulley 36 and 34.

The torque detecting device 40 is fixed to an attachment opening portion 22e positioned surrounding the pinion shaft 15. The torque detecting device 40 detects a torsion amount of the torsion bar 15c and outputs signals to the control portion ECU in response to the torsion amount. It is noted that the torsion bar referred here is a member having a torsional characteristics and is twisted in response to a difference in torque between an input shaft 15a and an output shaft 15b. The control portion ECU determines the steering center position by a learning control based on the neutral information and vehicle running state memorized in advance. The neutral information is an information of the position (electric angle) of the angle sensor memorized in the motor M corresponding to the steering center position and is measured when the vehicle is assembled. This information is memorized in the nonvolatile memory in the control portion ECU.

1-1-1. Damper Device

The damper device 50 will be explained further with reference to FIGS. 3 and 4 of the attached drawings. Accompanied by a forward input inputted in response to the steering operation by the driver of the vehicle, or accompanied by a reverse input inputted from an exterior of the vehicle via the steered wheel 26, the large diameter portion 51 is displaced in the A-axis direction and the impact absorbing member 53 of the damper device 50 absorbs impact to be generated when a collision of the large diameter portions 51 with the restricting surface 52b of the housing 52 is about to occur.

The damper device 50 according to the embodiment is provided at two portions, at each right and left side of the steering device ST in the A-axis direction. It is noted that the right side as viewed in FIG. 1 is referred to as "one side" and the left side in FIG. 1 is referred to as "the other side". Unless otherwise defined, the damper device 50 will be explained mainly based on "the other side" damper device neighboring the steering assist mechanism 30 in FIG. 1.

The damper device 50 includes the rack shaft 21, the large diameter portion housing 52 and the impact absorbing member 53. The rack shaft 21 of the damper device 50 includes large diameter portion 51, 51 and the shaft portion 211. (FIG. 1). The large diameter portion 51, 51 is formed at each end portion of the rack shaft 21. The shaft portion 211 is formed continuously from the respective large diameter portions 51, 51. The shaft portion 211 includes the ball screw portion 21b and the rack gear 21a.

Figure 3:
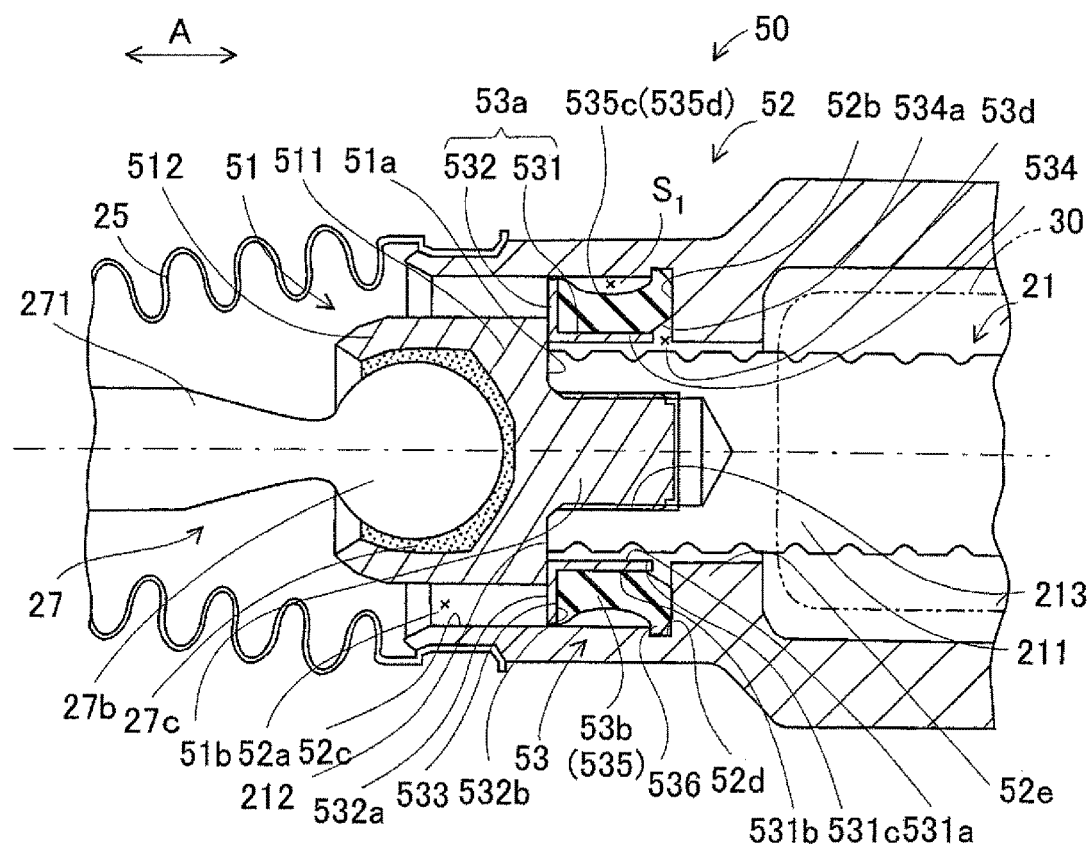
FIG. 3 is an enlarged cross sectional view showing the structure of the damper device.

As shown in FIG. 3, at the other side of the large diameter portion 51, a shaft portion 271 of the ball stud 27 is connected. An end portion 511 positioned at the "one side" of the large diameter portion 51 is connected to the shaft portion 211. The diameter of the end portion 511 is formed to be larger than the diameter of the shaft portion 211. A male screw portion 51*b* is formed at the end portion 511 extending from the end portion 511 in the A-axis direction. At the central portion of the end surface 212 of the shaft portion 211 of the rack shaft 21 is provided a female screw portion 213 which opens to the other side in the A-axis direction and engages with the male screw portion 51*b*.

At the root portion of the male screw portion 51*b*, a contact end surface 51*a* of the large diameter portion 51 is formed and the contact end surface 51*a* engages with the end surface 212. The contact end surface 51*a* is formed at the root portion of the male screw portion 51*b* and extends outwardly in a radial direction from the root portion of the male screw portion 51*b*. According to this embodiment, the contact end surface 51*a* is the most end surface 212 of the rack shaft 21. In other words, the contact end surface 51*a* serves as a so-called rack end. According to this structure, when the rack shaft 21 reciprocally moves in a straight line, the contact end surface 51*a* engages with the restricting surface 52*b* via the impact absorbing member 53 and serves as a stopper for restricting the reciprocal movement of the rack shaft 21.

The large diameter portion 51 is connected to the ball stud 27 at the other side end portion 512 and is further connected to the steered wheel 26 via the ball stud 27, the tie rod 24 and a knuckle (not shown) (See FIG. 2). The large diameter portion 51 forms a socket portion which accommodates the ball stud 27 therein at the end portion 512 positioned at the other side (See FIG. 3). A tip end of the ball stud 27 at the other side is formed in a spherical shape and is rotatably accommodated in the socket via a damper member 27*c*. The end portion of the shaft portion 271 and the knuckle which is connected to the steered wheel 26 are connected through the tie rod 24. The axial movement of the rack shaft 21 in the A-axis direction is transmitted to the knuckle via the tie rod 24, 24. Thus, the steered wheel 26 is turned to change the running direction of the vehicle. Then, the steered wheel 26 can be turned until the contact end surface 51*a* is engaged with the impact absorbing member 53 which is installed at the restricting surface 52*b*. In other words, this transmitting operation is referred to as a forward (or reverse) input operation.

Each of the large diameter portion housing 52, 52 forms a portion of the housing 22 which forms the one side end portion of the first housing 22*a* and the other side end portion of the second housing 22*b*. The large diameter portion housing 52, 52 is formed in a substantially bottomed cylindrical shape and each is arranged in the A-axis direction with an opening, open to respective vehicle wheel 26, 26 sides. Each large diameter portion housing 52 includes a shaft accommodating portion 52*e*, a large diameter portion accommodating portion 52*a*, the restricting surface 52*b* and the inner peripheral surface 52*c*.

As shown in FIG. 3, the shaft accommodating portion 52*e* and the large diameter portion accommodating portion 52*a* have columnar spaces respectively having substantially constant inner diameters and are formed co-axially with the A-axis. The shaft accommodating portion 52*e* accommodates the shaft portion 211 of the rack shaft 21, under the state that the shaft portion 211 is inserted into the shaft accommodating portion 52*e*. The large diameter portion accommodating portion 52*a* is open to the side where the steered wheel 26 is positioned for accommodating the shaft portion 211 and the large diameter portion 51 therein.

The restricting surface 52*b* is a flat bottom surface forming the bottom wall of the large diameter portion accommodating portion 52*a* and is formed facing toward the contact end surface 51*a* of the large diameter portion 51. The restricting surface 52*b* is brought into contact with the contact end surface 51*a*, which is the most end surface (rack end), through the impact absorbing member 53 to thereby restrict physically the range of movement of the rack shaft 21 in a straight line in the axial direction.

An inner peripheral surface 52*c* is an inner peripheral surface of the large diameter portion accommodating portion 52*a* and at an end portion of the inner peripheral surface 52*c* having a common surface with the restricting surface 52*b* at the restricting surface 52*b* side an annular recessed groove 52*d* (corresponding to groove) is provided, which diameter is enlarged towards outwardly in a radial direction from the inner peripheral surface 52*c*. The annular groove 52*d* is a recess which engages with an annular projection portion 536 to fix the impact absorbing member 53 on to the restricting surface 52*b*.

1-1-1-1. Impact Absorbing Member

Figure 5:
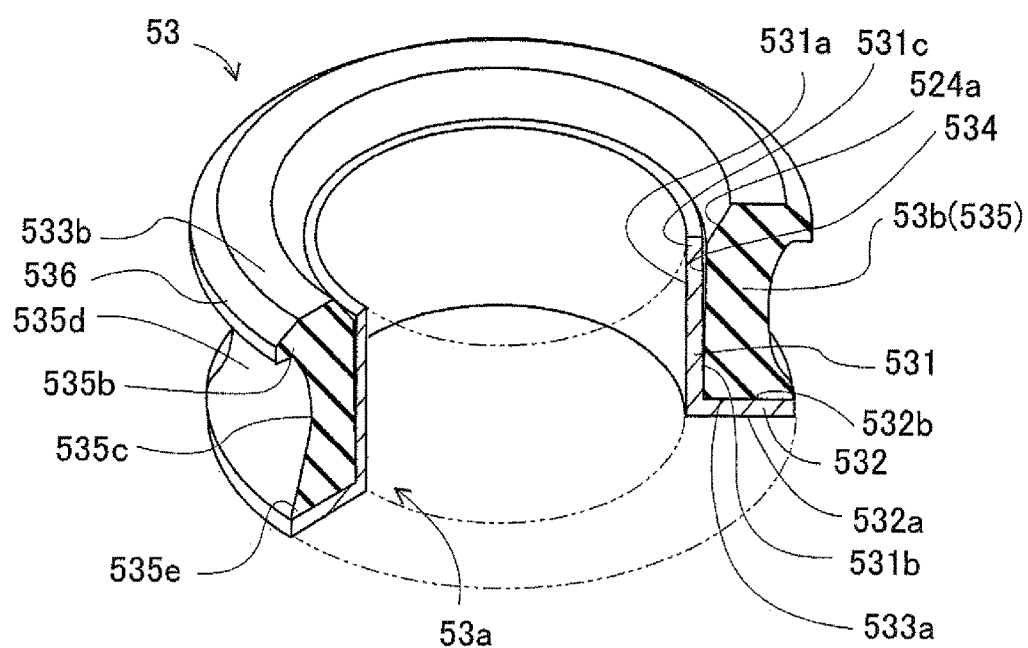
FIG. 5 is a partial cross sectional perspective view of the impact absorbing member.

The impact absorbing member 53 is provided for absorbing a collision impact generated upon the "end abutting". As shown in FIG. 5, the impact absorbing member 53 is formed by the impact receiving member 53*a* which is made by a cylindrical steel plate having a flange portion 532 and the elastic body 53*b* made from a rubber material and having approximately a cylindrical shape. The impact absorbing member 53 is inserted into the shaft portion 211 and is disposed between the contact end surface 51*a* of the large diameter portion 51 and the restricting surface 52*b* of the large diameter portion housing 52 in the A-axis direction. The impact absorbing member 53 is mounted on the restricting surface 52*b* of the large diameter portion housing 52 so that an end surface 532*a* to be contacted of the impact receiving member 53*a* faces to the contact end surface 51*a* of the large diameter portion 51.

In more detail, as shown in FIG. 3, the impact absorbing member 53 is approximately of an annular cylindrical shape in general, with the cylindrical portion 531 of the impact receiving member 53*a* being inserted into a through-hole of the elastic body 53*b*. The impact absorbing member 53 is formed by integrally adhering the end surface 533*a* of the elastic body 53*b* at the other side to the impact receiving member 53*a*. The impact receiving member 53*a* is formed by the cylindrical portion 531 and the flange portion 532. The cylindrical portion 531 faces to the inner peripheral surface 52*c* of the large diameter portion housing 52. The flange portion 532 extends from the cylindrical portion 531 outwardly in a radial direction and faces to the restricting surface 52*b* and yet is contactable with the large diameter portion 51. The elastic body 53*b* is disposed in an initially set space $S_0$ formed by the inner peripheral surface 52*c* of the housing 52, the restricting surface 52*b*, the outer peripheral surface 531*b* of the cylindrical portion 531 and the flange portion 532.

An opening 53*d* is provided at the inner peripheral surface of the impact absorbing member 53, opening at the end portion of the impact receiving member 53*a* with a distance D1. Therefore, the one side end portion of the inner peripheral surface 534 of the elastic body 53*b* under non-deformed state is exposed outside from the opening 53*d* inwardly in a radial direction of the cylindrical portion 531 of the impact receiving member 53*a*.

The cross section as viewed in the A-axis direction of the impact receiving member 53a is of an L-shape. One side of the L-shape of the cylindrical portion 531 is indicated as a horizontal side in the A-axis direction and the other side of the L-shape is indicated as a vertical side which crosses the A-axis line direction. When the impact receiving member 53a receives an impact force at the flange portion 532 caused by a contact or a collision from the contact end surface 51a of the large diameter portion 51, the impact receiving member 53a applies a compression force on the elastic body 53b to transmit the impact thereto and absorbs the impact thereby.

The cylindrical portion 531 is formed in approximately a straight cylindrical shape. The through-hole of the impact absorbing member 53 is provided at the inner peripheral surface 531a of the cylindrical portion 531 for inserting the shaft portion 211 therethrough, under the cylindrical portion 531 being assembled to the large diameter portion housing 52. The size of the outer diameter of the inner peripheral surface 531b of the cylindrical portion 531 is set so that the inner peripheral surface 534 of the elastic body 53b can be loosely inserted therein. The entire length of the cylindrical portion 531 is set to be a length corresponding to the compressive allowance (compression displacement X1).

Figure 4A:
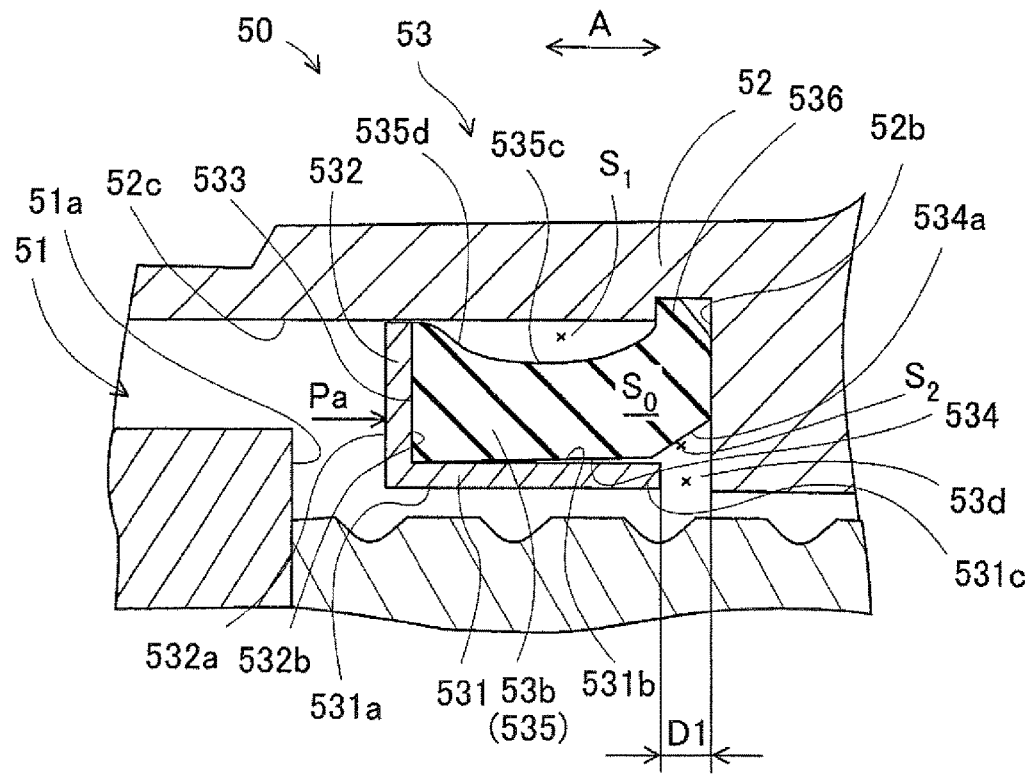
FIG. 4A is a cross sectional view showing the damper device under the state before the end abutting operation.
Figure 4B:
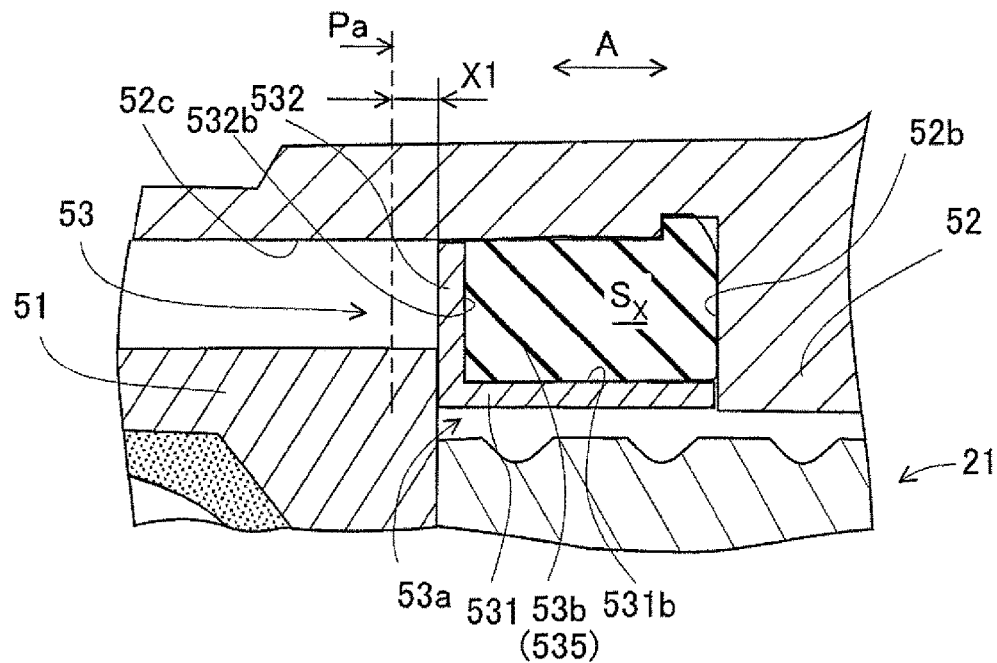
FIG. 4B is a cross sectional view showing the damper device under the state after the end abutting operation.

As shown in FIGS. 4A and 4B, the entire length of the cylindrical portion 531 in the A-axis direction is formed and adjusted so that the distance D1 between the end portion 531c of the cylindrical portion 531 and the restricting surface 52b under the non-deformed state of the impact absorbing member 53 (elastic body) disposed in the large diameter portion housing 52 becomes slightly larger than the compression displacement X1. FIG. 4A shows the impact absorbing member 53 under non-deformed state. FIG. 4B shows the compressed and deformed impact absorbing member 53 displaced by the compression displacement X1 in the A-axis direction. Symbol Pa in FIGS. 4A and 4B indicates the position of the end surface 532a to be contacted of the flange portion 532 under non-deformed state.

The cylindrical portion 531 is used for restricting the direction of the compression displacement of the inner peripheral surface 534 of the elastic body 53b to be along in the A-axis direction and further, the cylindrical portion 531 is also used for preventing the elastic body 53b from deforming inwardly in a radial direction not to protrude beyond the cylindrical portion 531.

The flange portion 532 is formed in an annular plate shape with a constant thickness. The flange portion 532 extends from the cylindrical portion 531 outwardly in a radial direction. The outer diameter of the flange portion 532 is set to be slightly smaller than the inner diameter of the inner peripheral surface 52c of the large diameter portion housing 52 (set to have a clearance of about 0.15 to 0.6 mm therebetween). The other side end surface 533a of the elastic body 53b is adhered to the rear surface 532b of the end surface 532a to be contacted of the flange portion 532.

Next, the elastic body 53b will be explained hereinafter. It is noted here that unless otherwise defined, the explanation will be made for the elastic body under non-deformed state. The collision impact that the impact receiving member 53a receives upon a direct contact between the impact receiving member 53a and the large diameter portion 51 is transmitted to the elastic body 53b which absorbs the impact by being deformed within the predetermined space. The elastic body 53b includes a cylindrical main body portion 535 and an annular projection portion 536.

The cylindrical main body portion 535 is of a drum shape having a neck portion at the central portion of the outer peripheral surface 535d in the A-axis direction. The annular projection portion 536 is a flanged portion projecting outwardly in a radial direction from the one side end portion of the cylindrical main body portion 535. The inner diameter of the cylindrical main body portion 535 is slightly larger than the outer diameter of the outer peripheral surface 531b of the cylindrical portion 531. Thus, the cylindrical portion 531 is inserted into the through-hole of the cylindrical main body portion 535.

The outer diameter of the cylindrical main body portion 535 is set to be smaller than the outer diameter of the flange portion 532 and under the state that the cylindrical main body portion 535 is assembled to the large diameter portion housing 52, a gap $S_1$ with a predetermined volume is formed between the outer peripheral surface 535d of the cylindrical main body portion 535 and the inner peripheral surface 52c of the large diameter portion housing 52. The elastic body 53b is disposed within the initially set space $S_0$ by the annular projection portion 536 being engaged with the annular groove 52d formed at the end portion of the inner peripheral surface 52c at the restricting surface 52b side. The initially set space $S_0$ is formed to be enclosed by the inner peripheral surface 52c of the large diameter portion housing 52, the outer peripheral surface 531b of the cylindrical portion 531 the restricting surface 52b and the flange portion 532.

The end surface 533a of the elastic body 53b at the other side is adhered to the rear surface 532b of the flange portion 532 (vulcanized adhesion). The inner peripheral surface 534 of the elastic body 53b is loosely inserted into the cylindrical portion 531 with a slight clearance G (See FIG. 8) provided between the inner peripheral surface 534 of the elastic body 53b and the outer peripheral surface 531b of the cylindrical portion 531. In other words, the inner peripheral surface 534 of the elastic body 53b is not adhered to the outer peripheral surface 531b of the cylindrical portion 531. The adhesion surface area of the elastic body 53b with other component is limited to an adhesion portion 533c of the flange portion 532. The adhesion portion 533c is provided substantially over the entire rear surface 532b of the flange portion 532 so that the maximum adhesion area can be assured. It is noted that when the adhesion is made by means of vulcanized adhesion, a predetermined adhesive agent is applied on the rear surface 532b of the flange portion 532 and after the un-vulcanized rubber is injected towards the rear surface 532b exposed in the metal mold, the flange portion is adhered to the elastic body 53b by vulcanization.

An enlarged diameter portion 534a is provided at a corner portion of the inner peripheral surface 534 of the elastic body 53b where the restricting surface 52b is positioned. The diameter of the enlarged diameter portion 534a is enlarged towards the restricting surface 52b side. The enlarged diameter portion 534a is formed with an inclination towards the restricting surface 52b in the A-axis direction, wherein the diameter thereof is enlarged from the position $R_1$ (See FIG. 8) at the inner peripheral surface 534 slightly inward in the flange portion side direction from the end surface of the end portion 531c of the cylindrical portion 531. The corner portion of the inner peripheral surface 534 facing to the opening 53d is properly inclined with an angle which can be suitably separated from the outer peripheral surface 531b of the cylindrical portion 531 upon the compressive deformation. Thus, when the elastic body 53b is deformed by compression, the inner peripheral surface 534 (enlarged diameter portion 534a) at the opening 53d would not be bitten in the end surface of the end portion 531c of the cylindrical portion 531.

The recessed portion 535c formed on the outer peripheral surface 535d of the elastic body 53b is the deepest at the central portion of the outer peripheral surface 535d in the A-axis direction and the outer diameter thereof becomes the smallest. In other words, the outer diameter of the outer peripheral surface 535d is formed to be larger at the corner portion 535e at the other side of the cylindrical main body portion 535 and the corner portion 535b at the one side of the cylindrical main body portion 535 than the diameter of the rest portion and from the corner portions 535a and 535b towards the center portion the diameter is gradually reduced. The corner portion 535e at the other side corresponds to the outer diameter of the adhesion portion 533c between the cylindrical main body portion 535 and the flange portion 532. The adhesion portion 533c is formed over the entire rear surface 532b of the flange portion 532. Since the central portion of the recessed portion 535c provided at the outer peripheral surface 535d of the elastic body 53b is easily outwardly expandable in a radial direction when the compressive deformation occurs, and also easily generates slidable friction with the inner peripheral surface 52c of the large diameter portion housing 52, the recessed portion 535c is provided to prevent occurrence of such undesirable problems as undesirable outward expansion, or frictional operation.

The material of the elastic body 53b according to the invention is not limited to a particular material and any material may be used, as long as such material can express a rubber like elasticity. For example, such as a crosslinked rubber, a thermoplastic or thermosetting synthetic resin system elastomer or the like can be used for forming the elastic body 53b. As the crosslinked rubber, a diene based rubber, such as, natural rubber, butadiene rubber, isoprene rubber, chloroprene rubber, styrene-butadiene rubber, acrylonitrile-butadiene rubber (hereinafter referred to also as "NBR"), etc. and a rubber to which a hydrogen is added to an unsaturated portion thereof or the like, as the thermosetting synthetic resin system elastomer, an olefin system rubber such as ethylene-propylene rubber, butylene rubber, acryl rubber, urethane rubber, silicone rubber, fluoro-rubber, etc., and as the thermoplastic synthetic resin system elastomer, an elastomer such as styrene system, olefin system, polyester system, polyurethane system, polyamide system, vinyl chloride or the like are examplified.

According to the embodiment of the invention, as the material for the elastic body 53b used in the impact absorbing member 53 to be installed in the large diameter portion housing 52 of the steering device ST, considering the issues of heat-resistance, cold resistance and weatherability performance, NBR, chloroprene rubber, butyl rubber, ethylene-propylene rubber, etc., may be suitably applied, and further, considering the oil resistance, NBR or chloroprene rubber having polar group may be suitably applied as an elastic body 53b.

1-1-1-2. Relative Movement Restriction by Elastic Body

According to the damper device 50 of the present invention, when the large diameter portion 51 applies the impact force on the flange portion 532, the elastic body 53b is deformed such that the elastic body 53b is brought into contact with all of the inner peripheral surface 52c of the large diameter portion housing 52 (housing 22), the outer peripheral surface 531b of the cylindrical portion 531, the restricting surface 52b and the flange portion 532. Accordingly, the feature of the impact receiving member 53a according to the embodiment is that by the deformed elastic body 53b, keeping the non-contact state relative to the restricting surface 52b, the relative movement to the large diameter portion housing 52 can be restricted. Detail will be explained hereinafter.

Figure 6A:
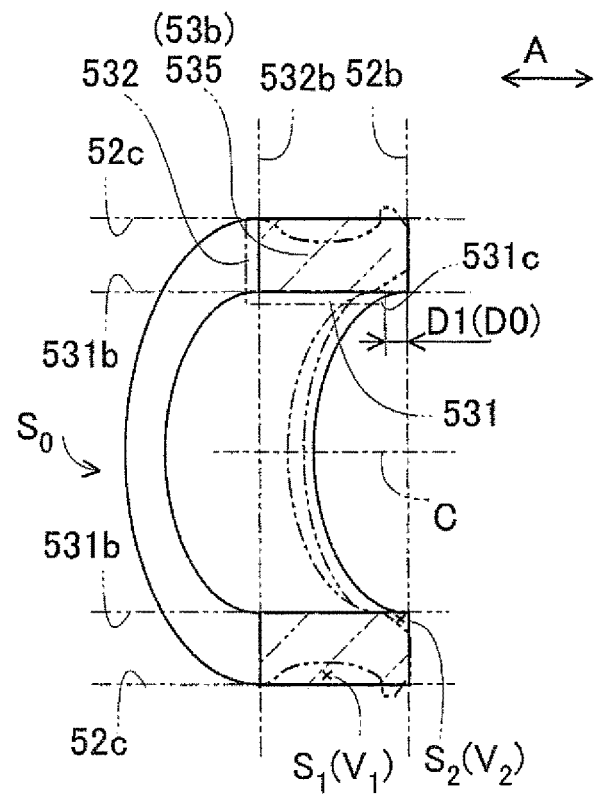
FIG. 6A is a first view showing the explanation of the relative movement restricting operation by the elastic body.

When the impact absorbing member 53 is disposed in the large diameter portion housing 52 under non-deformed state, the cylindrical main body portion 535 of the elastic body 53b is disposed in the initially set space $S_0$ formed by the inner peripheral surface 52c of the large diameter portion housing 52, the restricting surface 52b of the large diameter portion housing 52, the outer peripheral surface 531b and the flange portion 532, as shown in FIG. 6A. Further, under this non-deformed state, the elastic body 53b, the cylindrical portion 531 and the inner peripheral surface 52c are co-axially arranged relative to the center axis line C of the rack shaft 21, respectively (See FIG. 2). The elastic body 53b is a rotary body having a rotation axis of the center axis line C. Further, the restricting surface 52b of the large diameter portion housing 52 and the flange portion 532 are respectively arranged in a vertical direction relative to the center axis line C of the rack shaft 21 and are positioned in parallel with each other. Further, under the state before the impact force is applied, an opening 53d is formed between the end surface of the end portion 531c of the cylindrical portion 531 and the restricting surface 52b in the A-axis direction. The opening has a distance D1 which is slightly larger than the compression displacement X1 which corresponds to the compression allowance.

When the large diameter portion 51 does not apply the impact force on the flange portion 532, the elastic body 53b is disposed in the large diameter portion housing 52 with the gap S1 from the inner peripheral surface 52c thereof. Further, the elastic body 53b is disposed having a gap Sz on an outer peripheral surface of the cylindrical portion 531, which is an imaginal outer peripheral surface formed assuming that the end surface 531d of the cylindrical portion 531 extends up to the position of the restricting surface 52b in the A-axis direction. Assuming that the volumes $V_1$, $V_2$ of the rotary bodies in the gaps $S_1$ and $S_2$, having the rotation center axis C and assuming that the volume of the cylindrical main body portion 535 is Vr, the initially set space $S_0$ is formed to be the value which is the sum of the volumes $V_1$, $V_2$ and Vr. This relation is represented by the following equation (1):

$$S_0 = Vr + V_1 + V_2 \tag{1}$$

Figure 6B:
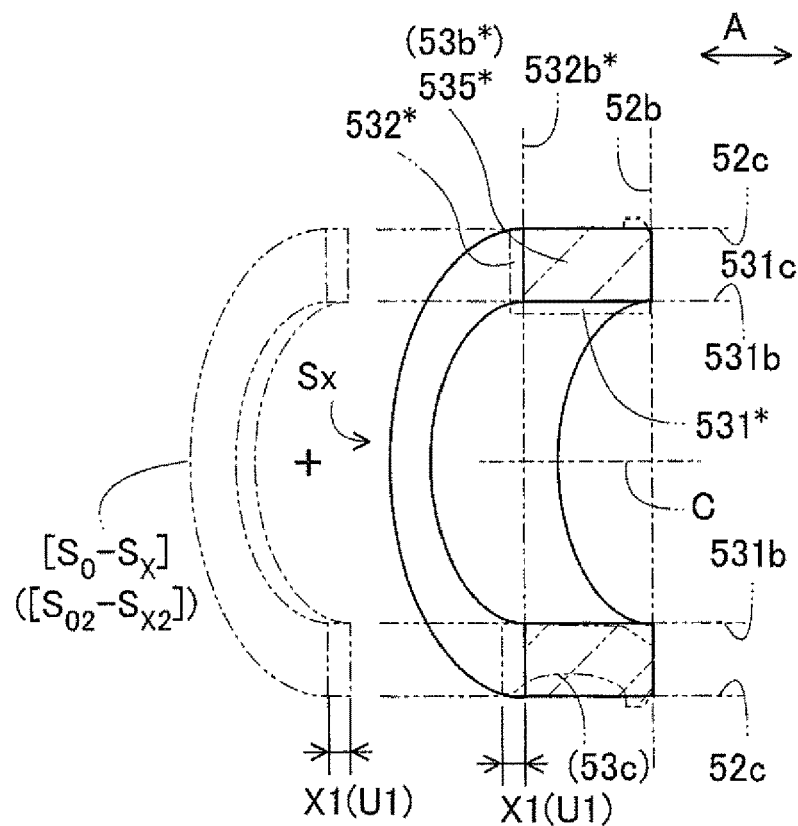
FIG. 6B is a second view showing the explanation of the relative movement restricting operation by the elastic body.

When the large diameter portion 51 applies the impact force on the flange portion 532, as shown in FIG. 6B, the cylindrical main body portion 535 is deformed by the restricting surface 52b and the flange portion 532 in the A-axis direction. Then, the cylindrical main body portion 535 is deformed by compression from the state shown in FIG. 6A to fill the gaps $S_1$ and $S_2$. Thus, the distance of the opening 53d between the end surface of the end portion 531c of the cylindrical portion 531 and the restricting surface 52b is gradually reduced from the value D1. Finally, the cylindrical main body portion 535 is compressively deformed to become the state that the cylindrical main body portion 535 is brought into contact with all of the inner peripheral surface 52c of the large diameter portion housing 52, the restricting surface 52b of the large diameter portion housing 52, the outer peripheral surface 531b of the cylindrical portion 531 and the flange portion 532* after being displaced in the A-axis direction by the distance X1. (The components with mark * illustrate the position thereof after the compressive deformation in FIG. 6B). Thus, the opening 53d is substantially closed thereby. The end surface of the end portion 531c of the cylindrical portion 531 is separated from the restricting surface 52b with a slight gap therebetween.

In other words, as shown in FIG. 6B, the cylindrical main body portion 535*, after the compressive deformation, is disposed in the compression space Sx to be filled up after the displacement by the distance X1 in the A-axis direction after the compressive deformation. Under this state, the volume of the cylindrical main body portion 535* after compressive deformation is kept constant between before and after the compressive deformation due to the non-compressive fluid characteristics of the elastic body 53b. Accordingly, the volume of the compression space Sx is equal to the volume Vr of the cylindrical main body portion 535 (cylindrical main body portion 535*) (See Equation (2)). Further, as shown in FIG. 6B, the volume change ($S_0$–Sx) between before and after the compressive deformation from the initially set space $S_0$ to the compression space Sx is equal to the sum of the volumes $V_1$, $V_2$ of the gaps S1, S2 (See Equation (3)).

$$Sx = Vr \quad (2)$$

$$(S_0 - Sx) = V_1 + V_2 \quad (3)$$

Figure 7:
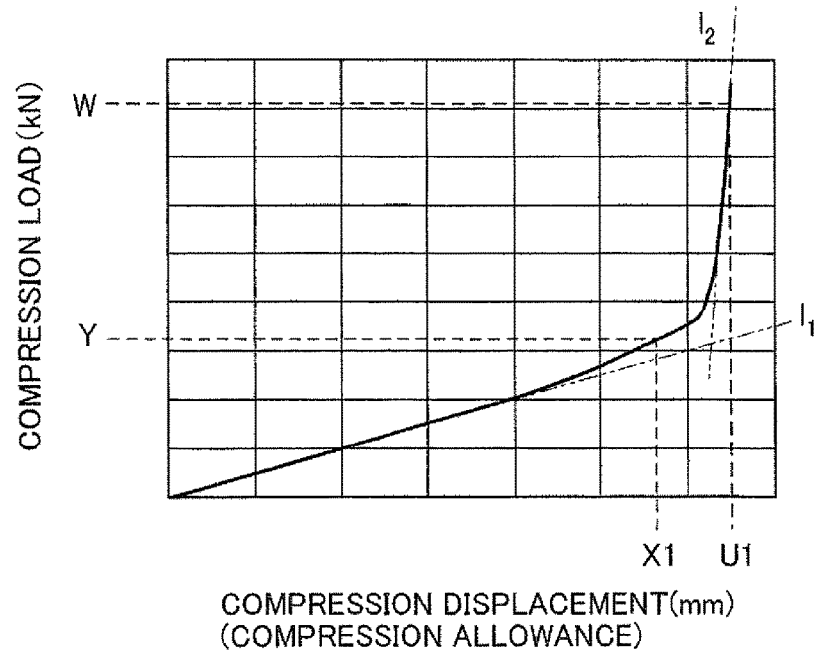
FIG. 7 is a graph showing the relationship between the compression load and displacement regarding to the impact absorbing member.

The impact absorbing member 53 has a relationship between the compression load and the compression displacement (compression allowance) as shown in a graph shown in FIG. 7, when the elastic body 53b is formed by a predetermined NBR material. As shown in the graph in FIG. 7, the compression load performance is indicated with the linear rubber like elasticity performance along the line $l_1$ within a predetermined small range of the compression load, but when the compression load becomes large beyond the predetermined range, the compression load performance is indicated with the elasticity performance along the line $l_2$ and the rigidity of the elastic body 53b becomes high to be cured.

As shown in the graph, at the compression displacement X1 (mm), the compression performance of the cylindrical main body portion 535 is on the line changing from the line $l_1$ to the line $l_2$ and at this point, it would be difficult for the main body portion to be compressively deformed even the impact force corresponding to the compression load Y [k N] in the graph is applied. For example, when the elastic body 53b receives the impact force which is 2.5 times larger than the compression load Y, the displacement of the main body portion 353c is only 1.16 times larger than the displacement X1 (mm). In other words, the cylindrical main body portion 535 displaced (compressively deformed) up to the X1 (mm) in the A-axis direction would not be displaced (compressively deformed) further, even the elastic body 53b receives the impact force in the A-axis direction.

The cylindrical main body portion 535* displaced by X1 (mm) is filled in the compression space Sx and there is no room for the compressive deformation in the space and is saturated in volume. At this time, the elastic body 53b is disposed in the compression space Sx and is sealed therein with an inscribed contact therein. There is no escape to the outside of the space. Accordingly, the elastic body 53b keeps continuing the filling state between the flange portion 532 and the restricting surface 52b to thereby preventing the impact absorbing member 53 from displacing in the restricting surface 52b side by the distance X1 (mm) or more. The impact receiving member 53a of the impact absorbing member 53 keeps the position that the end portion 531c (end surface) keeps the non-contact state with the restricting surface 52b. In other words, the relative movement of the impact absorbing member 53 to the large diameter portion housing 52 is prevented. Therefore, the metal made end portion 531c (end surface) and the metal made restricting surface 52b can be prevented from colliding with each other (metal to metal collision). In addition, the cured elastic body 53b interposed under the compressed and filled state in the space to achieve the advantageous effect of the impact transmission suppression.

1-1-1-3. Operation

Figure 8:
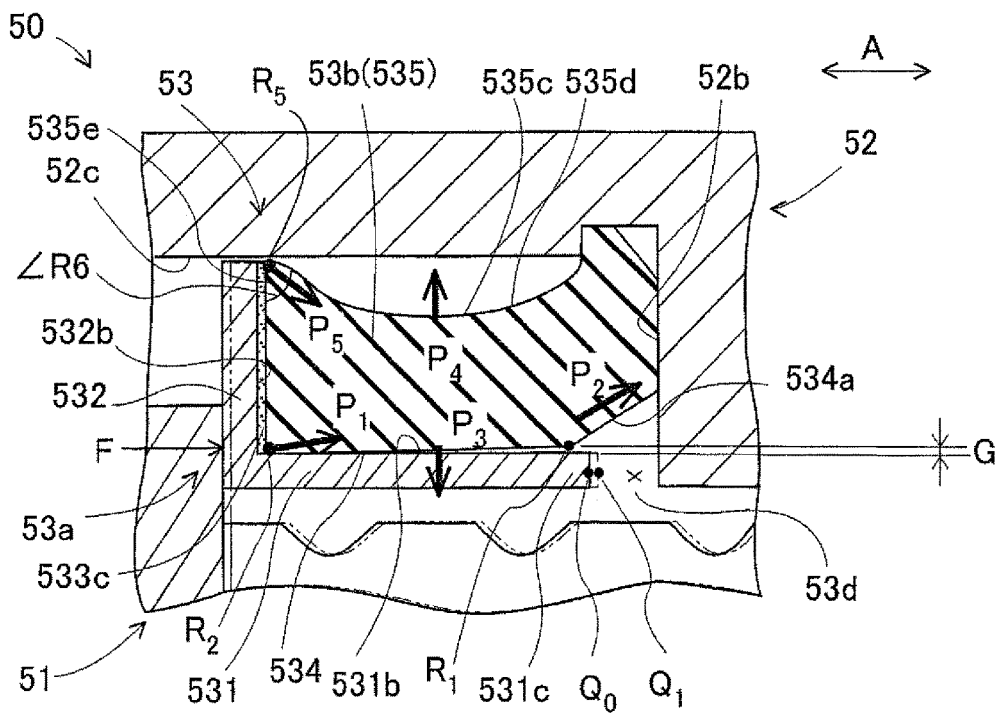
FIG. 8 is a view explaining the impact absorbing member immediately after the end abutting operation.

Further, the operation of the damper device according to the invention will be explained over time. FIG. 8 indicates the damper device 50 immediately after the large diameter portion 51 has applied the impact force on the flange portion 532. Further, FIG. 9 indicates the damper device 50 on the way of compressive deformation operation upon receipt of the impact force on the flange portion 532. As shown in FIG. 8, the impact receiving member 53a had a collision by the large diameter portion 51 at the "end abutting" and receives the impact force F in the A-axis direction. At this time, the impact receiving member 53a, which is made by a metal material, is displaced towards the restricting surface side prior to the portion of the elastic body 53b at the restricting surface side (See FIG. 8, displacement from $Q_0$ to $Q_1$). The enlarged diameter portion 534a is formed such that the diameter thereof is enlarged from the point R1 on the inner peripheral surface 534 of the elastic body 53b, which point is located more flange portion 532 side in the A-axis direction than the position of the end surface of the end portion 531c of the cylindrical portion 531 towards the restricting surface 52b side. The point $R_1$ which is the start point of the enlarged diameter portion 534a follows the displacement of the end surface of the end portion 531c of the cylindrical portion 531 and starts displacing towards the restricting surface 52b side belatedly with the displacement of the end surface of the end portion 531c of the cylindrical portion 531.

As shown in FIG. 9, even on the way of compressive deformation, the relation of the displacement that the elastic body which has been on the original point $R_1$ that is the starting point of diameter enlargement follows the displacement movement of the end surface of the end portion 531c of the cylindrical portion 531 belatedly continues. Accordingly, the relation that the elastic body which was on the original point $R_1$ is separately positioned from the restricting surface 52b with a distance which is larger than the distance of the end surface of the end portion 532c of the cylindrical portion 531 from the restricting surface 52b continues. Therefore, even the elastic body which was on the original point $R_1$ tries to move inwardly in a radial direction indicated as P3 arrow direction in FIG. 8, the outer peripheral surface 531b of the cylindrical portion 531 represses the elastic body and restricts the movement thereof.

Figure 11:
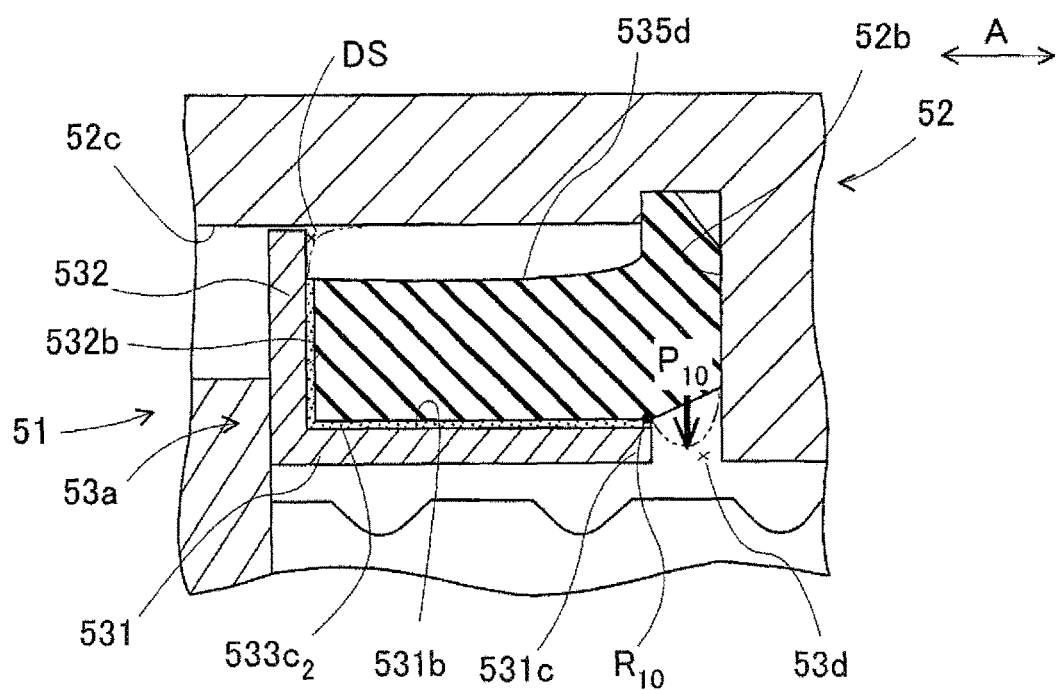
FIG. 11 is an explanatory view of the impact absorbing member immediately after the end abutting operation when the inner peripheral surface thereof is adhered.

It is noted that FIG. 11 shows the deformation direction of the compressive deforming elastic body 53b in the case that in addition to the adhesion of the elastic body 53b to the rear surface 532b of the flange portion 532, adhesion of the inner peripheral surface 534 of the elastic body to the outer peripheral surface 531b of the cylindrical portion 531 is made. As indicated by the drawing, the elastic body which receives the compressive force may flow out from the adhesion restraint portion $R_{10}$ which is the end edge of the adhesion portion $533c_2$ adhered to the end portion 531c of the cylindrical portion 531, as the starting point, towards inwardly in a radial direction indicated as $P_{10}$ arrow direction along on the end surface of the end portion 531c.

Further, a stress concentration may easily occur centering about the adhesion restraint portion $R_{10}$.

However, according to the example indicated in FIG. 8, the inner peripheral surface 534 of the elastic body 53b is a free front surface which is not adhered and any stress concentration derived from the adhesion to the outer peripheral surface 531b of the cylindrical portion 531 does not occur. Further, no restraint receives which directs in the $P_{10}$ arrow direction. Further, in the example indicated in FIG. 8, the inner peripheral surface 534 faces to the outer peripheral surface 531b of the cylindrical portion 531 with a slight gap G therebetween. Therefore, for example, compared to the structure that the inner peripheral surface 534 faces to and is in contact with the outer peripheral surface 531b of the cylindrical portion 531, it is considered that the degree of freedom which indicates the degree that the inner peripheral surface 534 does not receive restraint, is relatively high.

According to the example indicated in FIG. 8, the elastic body 53b, which has received the compressive force in the A-axis direction, starts compressive deformation from the adhesion restraint portion $R_2$, which is the edge portion of the adhesion portion 533c and the corner portion between the flange portion 532 and the cylindrical portion 531, as the starting point towards the restricting surface 52b direction indicated by the $P_1$ arrow as a stream. Further, the inner peripheral surface of the enlarged diameter portion 534a facing to the opening 53d follows the stream in the $P_1$ direction and begins deformation along in the inclined direction of the enlarged diameter portion 534a as a stream.

Further, as shown in FIG. 9, similarly, the inner peripheral surface 534 of the elastic body 53b under compressive deformation continues the flow along in the $P_1$ and $P_2$ directions to suppress the flow inwardly in a radial direction ($P_3$ arrow direction). Still further, the elastic body positioned at the original point $R_1$ is arranged outwardly in a radial direction of the outer peripheral surface 531b of the cylindrical portion 531 which precedes the displacement towards the restricting surface 52b side. Therefore, even the elastic body 53b which is positioned at the original point $R_1$ under compressive deformation tries to flow inwardly in a radial direction, such flowing movement is prevented by the outer peripheral surface 531b of the cylindrical portion 531. The elastic body at the peripheral surface of the enlarged diameter portion 534a formed continuously from the original position $R_1$ is more separately positioned from the outer peripheral surface 531b of the cylindrical portion 531 in a radial direction than the distance of the elastic body positioned at the original point $R_1$ from the outer peripheral surface 531b of the cylindrical portion 531 in a radial direction, depending on the degree of the enlargement of the diameter before the compressive deformation. Accordingly, even the elastic body flows inwardly in a radial direction out of the opening 53d, the outer peripheral surface 531b of the cylindrical portion 531 prevents the elastic body from flowing out.

According to the embodiment explained above, the distance D1 between the end surface of the end portion 531c of the cylindrical portion 531 and the restricting surface 52b is set to be slightly larger than the compression displacement X1. However, the present invention is not limited to the structure. For example, the distance D1 may be set to be larger than the compression displacement X1 by a predetermined length and the compression space Sx under the state that the elastic body 53b is filled up therein, may be provided with a relief portion (opening 53d) for the elastic body to be flown out from the compression space Sx. As explained, it is difficult for the inner peripheral surface 534 of the elastic body 53b to be relieved inwardly in a radial direction from the opening 53d. Therefore, the distance D1 can be largely set and the length of the elastic body which does not receive the restriction from the outer peripheral surface 531b of the cylindrical portion 531 under the compressive deformation can be largely set. Thus, the rubber like elasticity performance of the impact absorbing member can be properly maintained to improve the impact absorbing performance thereby to achieve the effect thereof.

As shown in FIG. 8, at the end portion of the outer peripheral surface 535d of the elastic body 53b in the flange portion 532 side in the A-axis direction, the corner portion 535e is restrained by the adhesion portion 533c and at the end portion of the outer peripheral surface 535d of the elastic body 53b in the restricting surface side in the A-axis direction, the annular projection portion 536 extending from the corner portion 535b (See FIG. 5) outwardly in a radial direction is restrained by the annular groove 52d. As shown in the drawing, the elastic body at the central portion which is far from the restraint portions (adhesion portion 533c and engaged portion of annular projection portion 536) of the both end portions in the A-axis direction is easily flown outwardly in a radial direction (arrow $P_4$ direction) and is most expandable outwardly in a radial direction.

Further, the outer peripheral surface 535d of the elastic body 53b has a shape wherein the corner portion 535e at the flange portion 532 side in the adhesion portion 533c has the maximum diameter and the diameter of the elastic body at this point $R_5$, as a starting point, begins to be reduced having an acute angle $R_6$ with the flange portion 532 inwardly in a radial direction and continuously reduces the diameter to the deepest recessed portion 535c at the central portion. Therefore, the flow of the elastic body positioned at the point $R_5$ can be easily guided along the reducing diameter direction inwardly in a radial direction as indicated with the $P_5$ arrow direction.

Further, as shown in FIG. 9, under the compressive deformation of the impact absorbing member 53 being in progress, the shape of the recessed portion 535c in the vicinity of the central portion of the outer peripheral surface 535d of the elastic body 53b is kept unchanged and a friction with the inner peripheral surface 52c of the large diameter portion housing 52 hardly occurs until the elastic body becomes in full filling state. Further, since the angle of the corner portion 535e makes an acute angle $R_6$, the flow direction of the elastic body at the original point $R_5$ can be guided easily inwardly in a radial direction along the direction $P_5$ indicated with the arrow direction. This can easily prevent friction with the inner peripheral surface 52c of the large diameter portion housing 52, as similar to the case at portion in the vicinity of the central portion. Further, this structure prevents generation of a dead space DS (See FIG. 11) formed by the inner peripheral surface 52c of the large diameter portion housing 52 and the elastic body. Therefore, an occupying ratio (a ratio in volume of the elastic body occupying the compression space Sx) when the elastic body 53b is fully filled up in the space Sx can be increased and therefore the rigidity of the elastic body becomes high to avoid the metal to metal collision. Thus, the relative movement of the impact receiving member 53a relative to the large diameter portion housing 52 can be effectively restricted to exhibit the relative movement restriction effect. Further, it becomes easy to increase the contact area (to enlarge the diameter) of the adhesion portion 533c and accordingly, the section modulus of the adhesion portion 533c where the stress is concentrated. Thus, the durability of the device can be assured.

1.2 Modified Embodiment 1

By using the rubber like elasticity performance shown in FIG. 7, an impact absorbing member which satisfies predetermined conditions. For example, depending upon individual user specifications, it is necessary to guarantee the impact absorbing function of the impact absorbing member (impact absorbing member 63) or the impact transmission suppression effect relative to the application of the impact force corresponding to the compression load W shown in FIG. 7. In such case, as the modified embodiment 1, the elastic body can be structured such that the elastic body is filled in the compression space Sx and the volume thereof becomes Vr, when the impact absorbing member 63 is compressively displaced by a displacement U1 (mm) in the A-axis direction relative to the large diameter portion housing 52. The symbol U1 (mm) means the compression displacement length corresponding to the compression load W in FIG. 7.

Figure 10A:
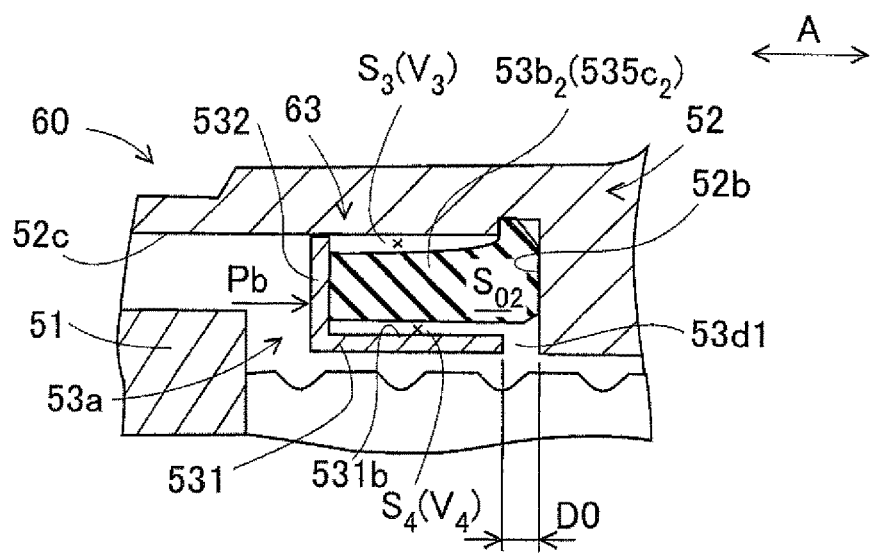
FIG. 10A is a cross sectional view explaining the impact absorbing member before the end abutting operation according to a modified embodiment 1.
Figure 10B:
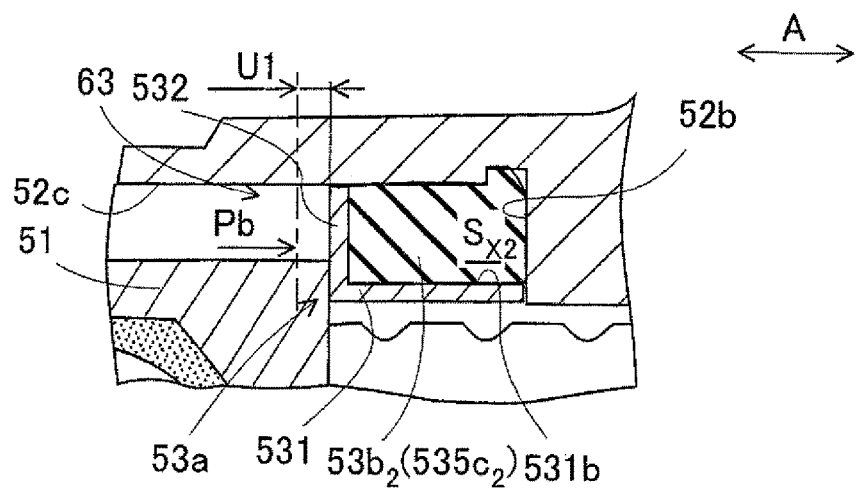
FIG. 10B is a cross sectional view explaining the impact absorbing member after the end abutting operation according to a modified embodiment 1.

It is noted that the volume change $[S_0-S_x]$ from the initially set space $S_0$ to the compression space Sx before and after the compressive deformation corresponds to the volume of the elastic body before the compressive deformation and the volume of the gap to be provided between at least one of the inner peripheral surface 52*c* of the large diameter portion housing 52 and the outer peripheral surface 531*b* of the cylindrical portion 531 and the elastic body before the compressive deformation. The shape of the gap is not limited to the shape according to the embodiments and detail shape of the modified embodiment 1 is illustrated in FIGS. 10A and 10B. It is noted that FIG. 10A indicates the impact absorbing member 63 under non-deformed state and FIG. 10B indicates the impact absorbing member 63 under the state that the impact absorbing member 63 is compressed and is displaced by the compression displacement U1 in the A-axis direction. In FIGS. 10A and 10B, the symbol Pb indicates the position in the A-axis direction of the end surface 532*a* to be contacted of the flange portion 532 under non-deformed state.

The volume change $[S_{02}-S_{x2}]$ between before and after the compressive deformation corresponding to the displacement U1 (mm) is obtained by multiplying the area of the rear surface 532*b* of the flange portion 532 by the displacement U1. (See FIG. 6B). The damper device 60 according to the modified embodiment 1 is provided having a gap S3 between the elastic body 53$b_2$ and the inner peripheral surface 52*c* of the large diameter portion housing 52 before the compressive deformation (See FIG. 10A). Further, another gap S4 is provided between the elastic body 53$b_2$ and the outer peripheral surface 531*b* of the cylindrical portion 531.

It is noted that assuming that the volumes of the gaps S3 and S4 have the values of V3 and V4, respectively, the size of the gaps S3 and S4 can be adjusted so that the sum of the volumes V3 and V4 becomes equal to the volume change $[S_{02}-S_{x2}]$ between before (FIG. 10A; before deformation) and after (FIG. 10B; after deformation) the compressive deformation (See Equation (3)). Then, by totaling the volumes $V_3$ and $V_4$ of the gaps S3 and S4 and the volume Vr2 of the cylindrical main body portion 535*c*2, the initially set space $S_{02}$ can be formed. Further, an opening portion 53*d*1 disposed between the end surface of the end portion 531*c* of the cylindrical portion 531 and the restricting surface 52*b*, having a distance D0 therebetween which is slightly larger than the displacement U1 along in the A-axis direction. As shown in FIG. 10B, the elastic body 53$b_2$ which receives the impact force at the impact absorbing member 63 continues to be existed under the state that the elastic body is filled in the compression space $Sx_2$ having the volume $Vr_2$ between the flange portion 532 and the restricting surface 52*b*. Thus, the impact absorbing member 63 which received the impact force is restricted from a displacement equal to or more than U1 (mm) in the A-axis direction.

According to the modified embodiment 1, the rigidity of the elastic body 53$b_2$ of the impact absorbing member 63 which has been displaced with the value U1 due to the compressive deformation becomes further larger than the rigidity of the elastic body 53$b_2$ which is displaced by the value X1 (mm). Accordingly, the relative movement restriction effect by the elastic body 53$b_2$ which volume is saturated inside of the compression space $Sx_2$ can be more improved. In each case, preparing for the case when the impact force received by the impact absorbing member 53, 63 from the large diameter portion 51 is inputted reversely, the user may require the anti-impact force performance, which can tolerate the impact force of two to five times larger than the compression load W [k N]. However, even in such case, as long as the input time for the reverse inputting is a momentary, the relative movement restriction effect of the impact receiving member 53*a* can be sufficiently achieved by the elastic body 53*b*, 53$b_2$ which volume is saturated upon compression operation. Thus, the impact transmission suppression effect can be also achieved. Further, according to the restricting method for restricting the relative movement of the impact receiving member 53*a* by the volume saturating elastic body 53*b*, 53$b_2$, the displacement length by the compressive deformation of the elastic body 53*b*, 53$b_2$ can be limited to the value of X1 (mm) or U1 (mm) at most according to the embodiments. Accordingly, fatigue or durability deterioration of the impact absorbing member 53, 63 caused by an unexpected large displacement amount can be suppressed.

It is noted that according to the modified embodiment 1, the elastic body 53*b* is disposed between the inner peripheral surface 52*c* of the large diameter portion housing 52 (housing 22) and the outer peripheral surface 531*b* of the cylindrical portion 531 having a gap $S_1$ and a radial gap G etc. However, this is not limited to this structure and the elastic body 53*b* may be disposed between the inner peripheral surface 52*c* of the large diameter portion housing 52 (housing 22) and the outer peripheral surface 531*b* of the cylindrical portion 531 having a gap at one side only (gap with the inner peripheral surface 52*c* of the housing 22 side or the outer peripheral surface 531*b* of the flange portion 532 side). Either structure can achieve the corresponding effect. Further, the connection between the cylindrical main body portion 535 and the flange portion 532 may be either adhesive connection or non-adhesive connection. Both connection methods can achieve the effect of the invention.

2. Second Embodiment

2-1. Damper Device

Next, the damper device 150 according to the second embodiment will be explained hereinafter. The damper device 150 according to the second embodiment differs from the damper device 50 of the first embodiment only in the structure of the impact absorbing member 153. In other words, the damper device 150 includes the rack shaft 21 (corresponding to the shaft), the large diameter portion housing 52, 52 (housing) and the impact absorbing member 153, 153. In more detail, compared to the structure of the impact absorbing member 53 according to the first embodiment, the impact absorbing member 153 of the second embodiment differs in that the impact absorbing member 153 includes annular projecting protection plate 153c. This different point will be explained in detail and explanation of the other similar portions will be omitted. The same portions corresponding to the damper device 50 will be explained by referencing with the same numerals or symbols.

2-1-1. Impact Absorbing Member

Figure 12:
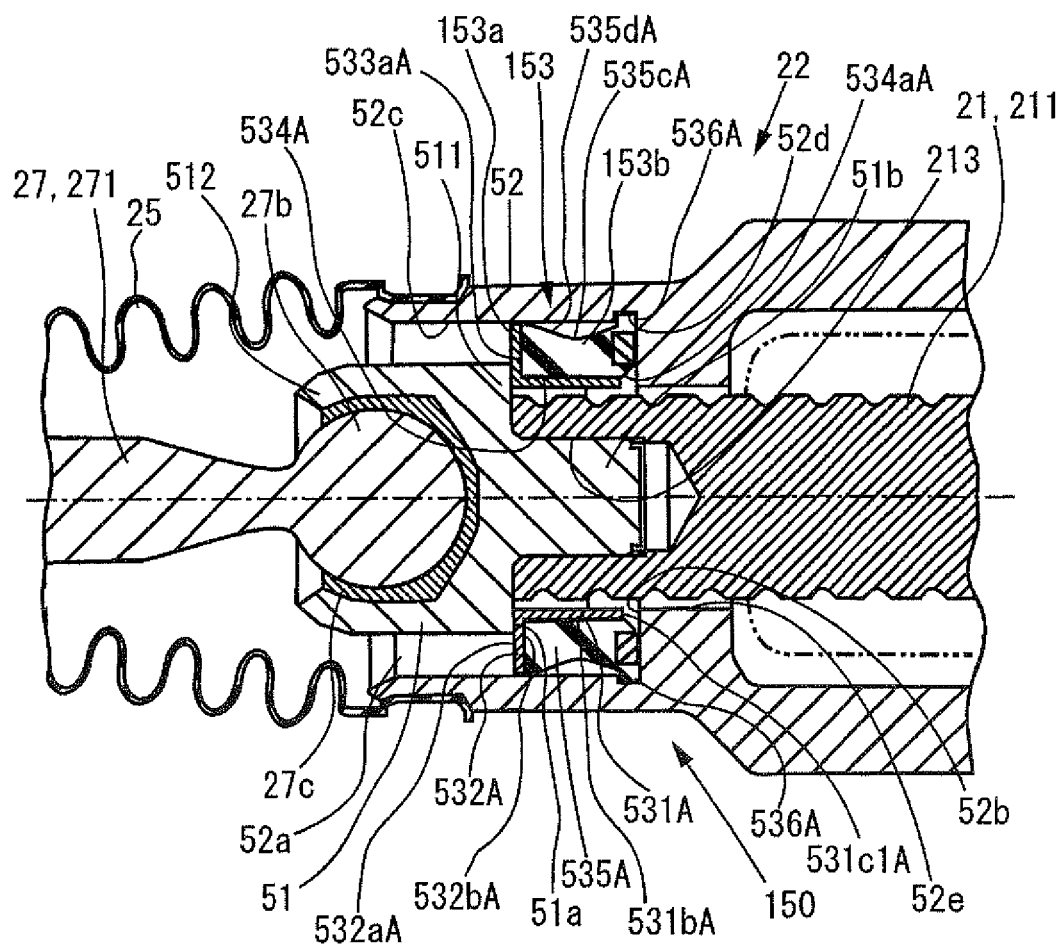
FIG. 12 is an enlarged cross sectional view of the structure of the damper device according to the second embodiment.
Figure 13:
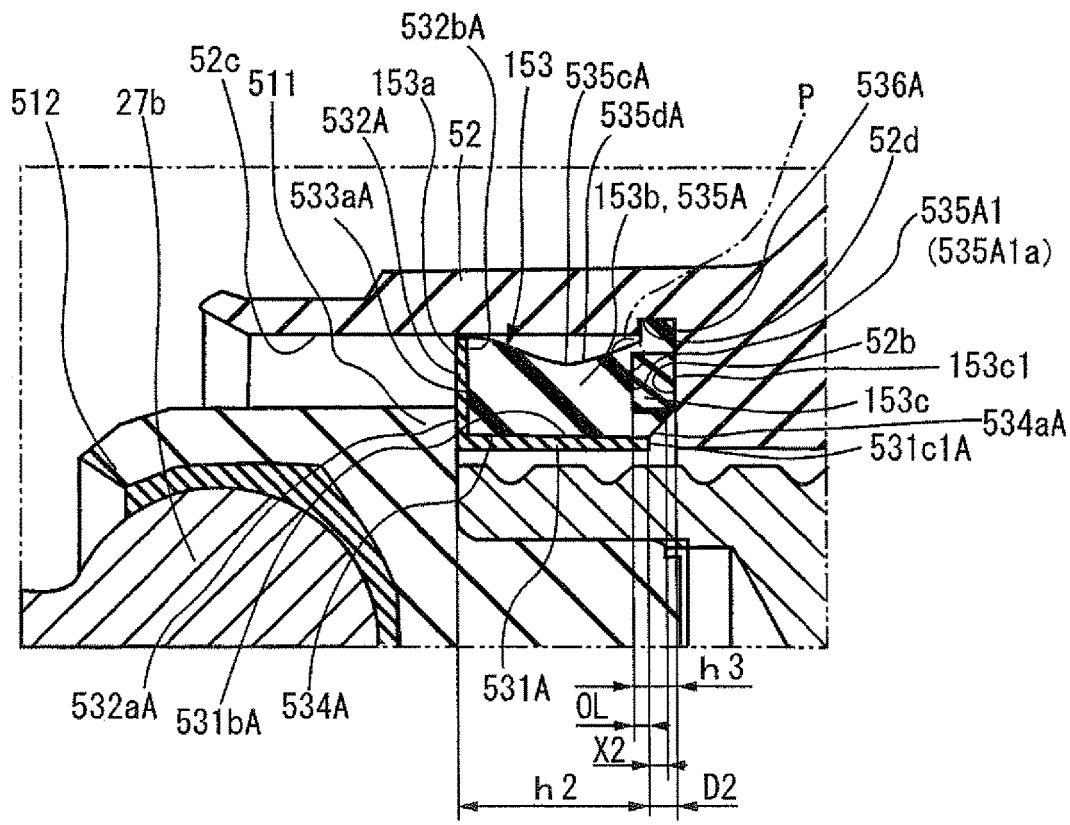
FIG. 13 is a cross sectional view showing the state of the damper device before the end abutting operation.

As shown in FIGS. 12 and 13, the impact absorbing member 153 includes the impact receiving member 153a, the elastic body 153b and the annular projecting protection plate 153c. It is noted here that FIG. 13 indicates the sectional view of the impact absorbing member 153 of the damper device 150 under the state before "end abutting". The cross section as viewed in the A-axis direction of the impact receiving member 153a is of L-shape and the impact receiving member 153a is formed by a steel plate and similar to the impact receiving member 53a according to the first embodiment, the impact receiving member 153a of this embodiment has the same shape and the same function to those of the impact receiving member 53a of the first embodiment. As indicated in FIGS. 12 and 13, the impact receiving member 153a includes the cylindrical portion 531A which faces to the inner peripheral surface 52c of the large diameter portion housing 52 (housing 22). Further, the impact receiving member 153a includes the annular circular plate made flange portion 532A extending from the end portion of the cylindrical portion 531A outwardly in a radial direction.

The height h2 (See FIG. 13) of the cylindrical portion 531A in the A-axis direction is decided by the length corresponding to the compression allowance X2 of the impact absorbing member 153 and the height h3 from the restricting surface 52b of the projecting protection plate 153c. In more detail, under the state that the cylindrical main body portion 535A of the elastic body 153b provided at the impact absorbing member 153 arranged in the large diameter portion housing 52 is non-deformed, the height h2 of the cylindrical portion 531A is adjusted to be larger than the compression displacement X2. Further, under the state that the cylindrical main body portion 531A is non-deformed, as shown in FIG. 13, the cylindrical portion 531A and the projecting protection plate 153c are adjusted to be overlapping with each other by the length OL.

Now the structure of the elastic body 153b will be explained. It is noted here that unless otherwise defined, the explanation will be made for the elastic body 153b under non-deformed state. As shown in FIG. 13, the elastic body 153b includes the cylindrical main body portion 535A and the projection portion 536A. The cylindrical main body portion 535A is arranged between the restricting surface 52b and the rear surface 532b of the flange portion 532A at the restricting surface 52b side. The constricted recessed portion 535cA is provided at the central portion of the outer peripheral surface 535dA of the cylindrical main body portion 535A in the A-axis direction. The shape of the recessed portion 535cA is formed similar to the shape of the constricted recessed portion 535c of the cylindrical main body portion 535 according to the first embodiment and same effect thereof can be achieved.

The other side end surface 533aA of the cylindrical main body portion 535A is adhered to the rear surface 532bA of the flange portion 532A at the restricting surface 52b side. The method of adhesion and the area of the adhesion are the same with those of the first embodiment. The cylindrical portion 531A of the impact receiving member 153a inserted into the inner peripheral surface 534A of the cylindrical main body portion 535A with a slight gap therebetween. In other words, inner peripheral surface 534A of the cylindrical main body portion 535A and the cylindrical portion 531A are not adhered and only the area between the rear surface 532bA of the flange portion 532A at the restricting surface 52b side is adhered.

A tapered enlarged diameter portion 534aA is provided at a corner portion of the inner peripheral surface 534A of the cylindrical main body portion 535A at the restricting surface 52b side. The diameter of the enlarged diameter portion 534aA is enlarged towards the restricting surface 52b. The enlarged diameter portion 534aA is formed with an inclination in the A-axis direction from a position of the inner peripheral surface 534A as a starting point, which agrees with the end surface 531cA of the end portion 531cA of the cylindrical portion 531A at the restricting surface 52b side. Under the state that the cylindrical main body portion 535A is non-deformed, the cylindrical portion 531A is arranged so that a predetermined distance D2 is formed between the end surface 531c1A of the cylindrical portion 531A and the restricting surface 52b (See FIG. 13). The enlarged diameter portion 534aA is elastically deformed upon compression of the cylindrical main body portion 535A (See FIG. 14), as similar to the enlarged diameter portion 534a according to the first embodiment, so that the cylindrical main body portion 535A would not be flown out into a space between the end surface 531c1A of the cylindrical portion 531A and the restricting surface 52b, thereby preventing the cylindrical main body portion 535A which has been flown out into the space between the end surface 531c1A of the cylindrical portion 531A and the restricting surface 52b from being bitten therein.

Figure 15:
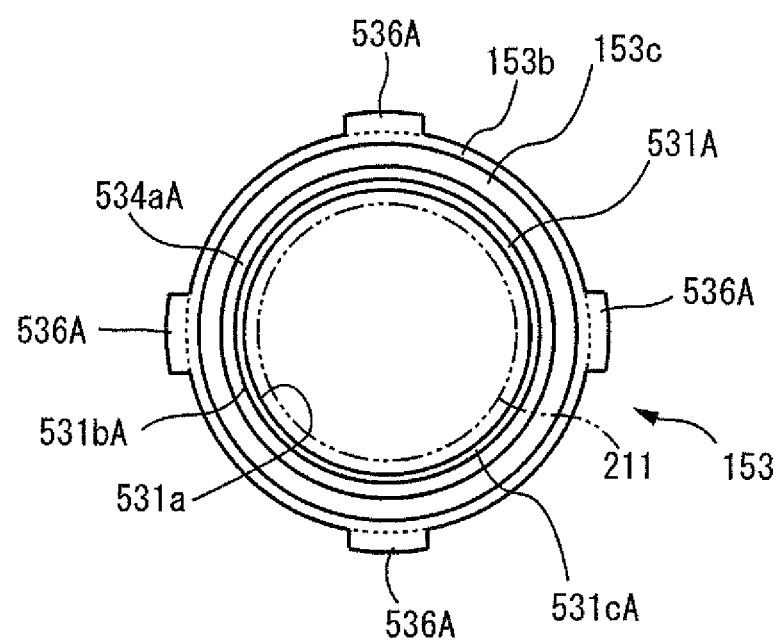
FIG. 15 is a view of the damper device seen from the contacting side with the restricting surface.

The projection portion 536A corresponds to the annular projection portion 536 of the cylindrical main body portion 535 according to the first embodiment. The projection portion 536A is provided at four portions (See FIG. 15) each projecting outwardly in a radial direction from the outer peripheral surface 535dA of the cylindrical main body portion 535A at the restricting surface 52b side and is accommodated (press-fit) in the annular groove 52d (corresponding to the groove). The four projection portions 536A are arranged on the outer peripheral surface 535dA with an equal distance apart from one another in the circumferential direction. The projection portion 536A is designated as portion P in FIG. 15 and is connected to the cylindrical main body portion 535A. The projection portion 536A is accommodated (press-fit) in the annular groove 52d formed at the inner peripheral surface 52c of the large diameter portion housing 52 and the axial position of the impact absorbing member 153 is fixed (restricted from axial movement). It is noted that the projection portion 536A may be formed to be an annular projection portion 536 having projections continuously provided in the circumferential direction.

Figure 14:
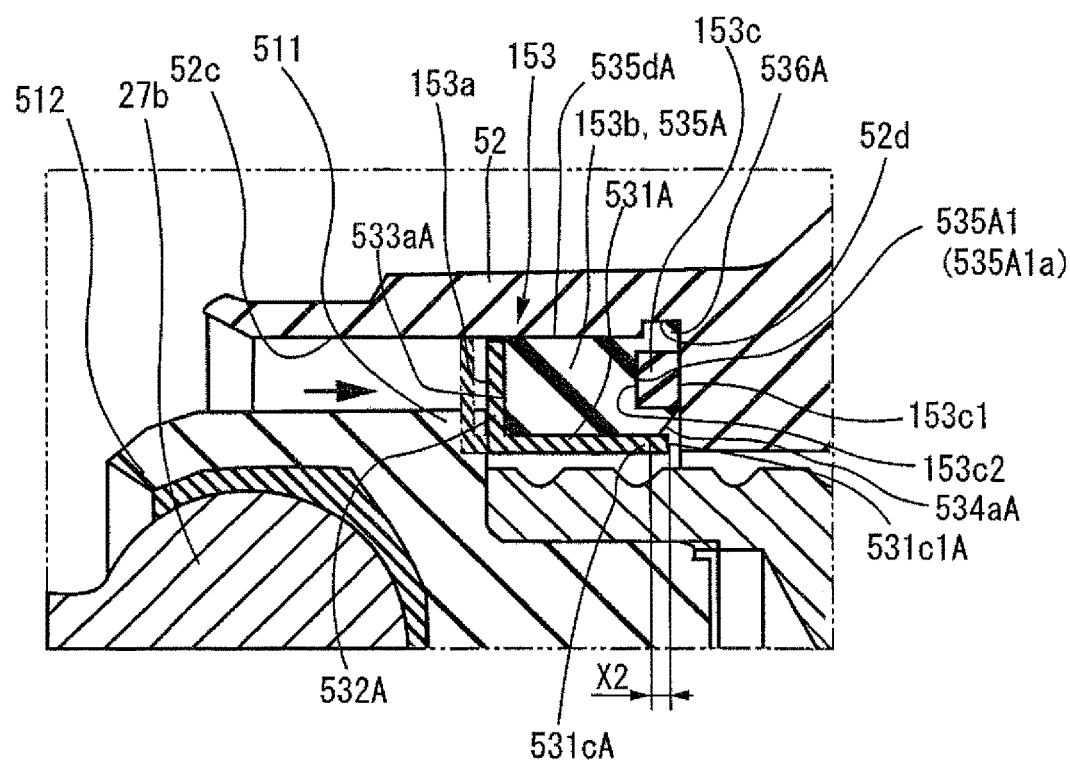
FIG. 14 is a cross sectional view showing the state of the damper device after the end abutting operation.

The projecting protection plate 153c indicated in FIGS. 12 through 14 is a metal, such as a steel-made, annular member. The projecting protection plate 153c is arranged inwardly in a radial direction (inner periphery side) relative to the projection portion 536A and is embedded in the cylindrical main body portion 535A, under the one side end surface 153c1 being exposed to the restricting surface 52b side. The other end surface 153c2 (corresponding to the one end surface) of the projecting protection plate 153c is adhered and fixed to the bottom surface 535A1a of the annular groove 535A1 formed on the cylindrical main body portion 535A. Thus, the one end surface 153c1 of the projecting protection plate 153c exposed to the restricting surface 52b side becomes contactable with the restricting surface 52b. It is noted that this invention is not limited to the embodiment and the projecting protection plate 153c may be formed by inserting into the cylindrical main body portion 535A and as long as the cylindrical main body portion 535A is formed by rubber material, the vulcanization molding may be used for forming the cylindrical main body portion.

The height (See FIG. 13) from the restricting surface 52b to the other side end surface 153c2 (one side end surface) of the projecting protection plate 153c is set to "h3". Under the state that the cylindrical main body portion 535A is non-deformed, the height "h3" is formed to be larger than the distance D2 between the restricting surface 52b and the end surface 531c1A of the end portion 531cA of the cylindrical portion 531A. The cylindrical portion 531A and the projecting protection plate 153c are arranged to be overlapping with each other by the length OL in the A-axis direction. It is noted that the material forming the elastic body 153b according to the embodiment is the same with that of the first embodiment and detail explanation thereof will be omitted and the material of the elastic body of the other embodiments are the same with that of the first embodiment and the explanation thereof will be also omitted.

2-1-2. Operation

According to the damper device 150 according to the second embodiment, when the large diameter portion 51 applies the impact force on the end surface 532aA to be contacted, from the starting point under the state indicated in FIG. 13, the cylindrical main body portion 535A of the elastic body 153b is sandwiched between the projecting protection plate 153c (restricting surface 52b) and the flange portion 532A and is deformed (compressed) in the axial direction to be displaced. Therefore, the cylindrical main body portion 535A is deformed to find any relief portion. Then, the cylindrical main body portion 535A is deformed towards the inner peripheral surface 52c of the large diameter portion housing 52 (housing 22) to fill the initially set space gap (corresponding to the gap $S_1$ of the first embodiment).

Then, finally, as shown in FIG. 14, the cylindrical main body portion 535A compresses the entire surfaces of the inner peripheral surface 52c of the large diameter portion housing 52, the outer peripheral surface 531bA of the cylindrical portion 531A, the projecting protection plate 153c and the rear surface 532bA of the flange portion 532 at the restricting surface 52b side, which has been displaced by the compression displacement X2 in the A-axis direction and is compressively deformed. In other words, as shown in FIG. 14, the cylindrical main body portion 535A is filled in the space, which is formed after the compression of the flange portion 532A in the A-axis direction by the compression displacement X2.

Accordingly, the impact force applied on the flange portion 532A by the large diameter portion 51 is suitably absorbed by the operation of the elastic deformation of the cylindrical main body portion 535A, as similar to the case of the first embodiment. It is noted that the cylindrical main body portion 535A is made by a non-compressive fluid and accordingly, the impact receiving member 153a will not be displaced any more in the A-axis direction towards the restricting surface 52b side. Thus, the cylindrical portion 531A of the impact receiving member 153a does not make contact with the restricting surface 52b and keeping the non-contact state therewith, the relative movement relative to the large diameter portion housing 52 (housing 22) is restricted by the cylindrical main body portion 535A of the deformed elastic body 153b.

The stress generated in the cylindrical main body portion 535A is applied mainly on the Inner peripheral surface 52c of the large diameter portion housing 52, the outer peripheral surface 531bA of the cylindrical portion 531A, the contact surface between the projecting protection plate 153c and the cylindrical main body portion 535A and the rear surface 532bA of the flange portion 532A at the restricting surface 52b side. However, the stress application on the projecting portion 536A is prevented from the projecting protection plate 153c and is hard to be influenced by the stress increased in the cylindrical main body portion 535A. Thus, since the excessive stress is not applied on the projection portion 536A, the projecting portion 536A would not be damaged thereby to eventually improve the durability of the elastic body 153b.

Further, as explained above, under the non-deformed state of the cylindrical main body portion 535A shown in FIG. 13, the cylindrical portion 531A and the projecting protection plate 153c are arranged overlapping with each other in the A-axis direction by a length OL. Therefore, at the further inner peripheral surface side corner portion (enlarged diameter portion 534aA) of the projecting protection plate 153c in the cylindrical main body portion 535A, the projecting protection plate 153c prevents the body in the cylindrical main body portion 535A from movement. Thus, a portion of the cylindrical main body portion 535A is prevented suitably from flowing out and being bitten in between the end surface 531c1A of the cylindrical portion 531A and the restricting surface 52b. However, the invention is not limited to this structure and the following structure that under the non-deformed state of the cylindrical main body portion, no overlapping is formed between the cylindrical portion 531A and the projecting protection plate 153c but after the compression deformation of the cylindrical main body portion 535A, such overlapping is formed is within the scope of the invention and the corresponding effects can be achieved thereby.

It is further noted that according to the second embodiment as explained above, under the non-deformed state of the cylindrical main body portion 535A, the enlarged diameter portion 534aA is formed with inclination from the position of the inner peripheral surface 534A agreeing with the position of the end surface 531c1A of the end portion 531cA of the cylindrical portion 531A towards the restricting surface 52b. However, the invention is not limited to this structure and the enlarged diameter portion 534aA may be formed with inclination from the position of the inner peripheral surface 534A agreeing with the position of the end surface 531c1A of the end portion 531cA of the cylindrical portion 531A positioned further flange portion 532A side towards the restricting surface 52b. This structure also achieves the effect of the invention.

3. Third Embodiment 3-1. Damper Device

Next, the damper device 250 according to the third embodiment will be explained hereinafter. The damper device 250 according to the third embodiment differs from the damper devices 50, 150 of the first and the second embodiments in the structures of the large diameter portion 251 of the rack shaft 221 (corresponding to the shaft) and of the impact absorbing member 253. Accordingly, the damper device 250 includes the rack shaft 221 (corresponding to the shaft), the large diameter portion housing 52, 52 (housing) and the impact absorbing member 253, 253. In more detail, compared to the structures of the impact absorbing members 53, 153 according to the first ad the second embodiments, the impact absorbing member 253 of the third embodiment differs in the shapes of the large diameter portion 251, the impact receiving member 253a and the elastic body 253b. The different points will be explained in detail and explanation of the other similar portions will be omitted. The same portions corresponding to the damper device 50 will be explained by referencing with the same numerals or symbols.

Figure 16:
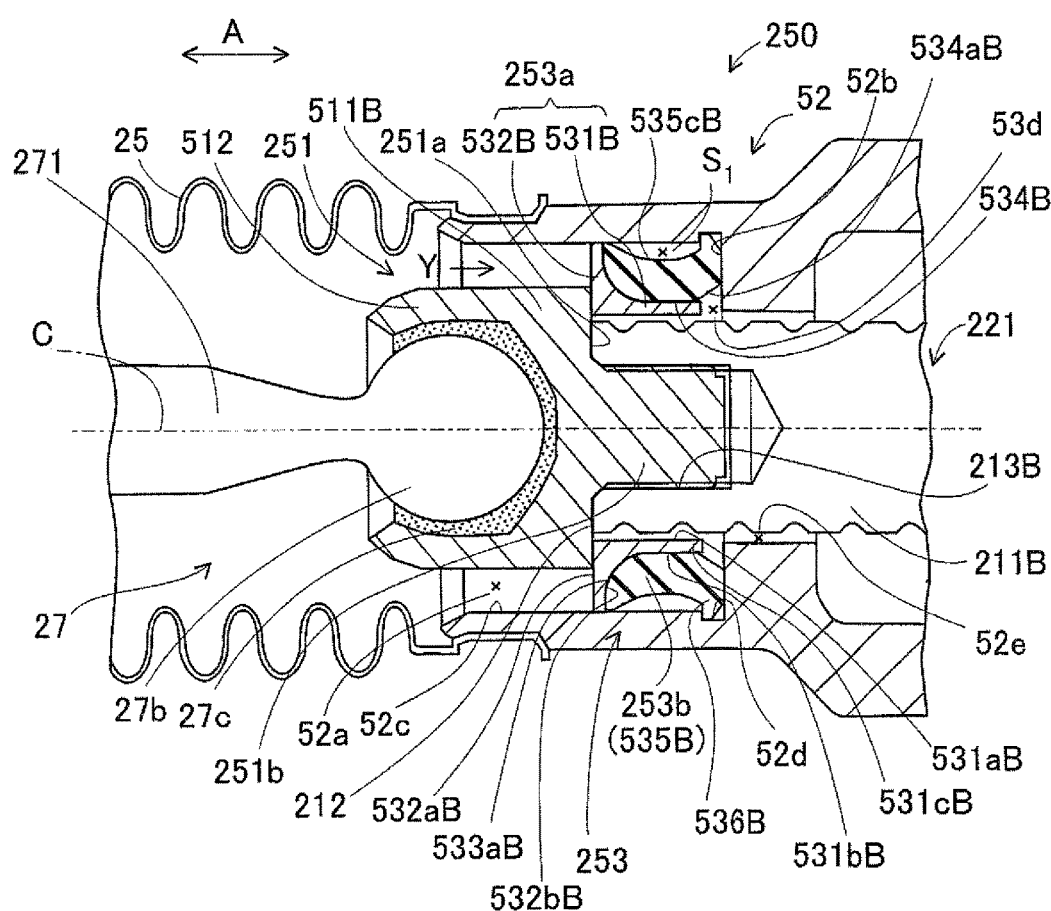
FIG. 16 is an enlarged cross sectional view of the structure of the damper device according to the third embodiment.

As shown in FIG. 16, the rack shaft 221 includes a shaft portion 211B and a large diameter portion 251 connected to the shaft portion 211B. At the root portion of the male screw portion 251b of the large diameter portion 251, the contact end surface 251a is formed and the contact end surface 251a is formed outwardly in a radial direction extending from the root portion of the male screw portion 251b. The contact end surface 251a is in contact with the flange portion 532B of the impact receiving member 253a arranged at the end surface of the impact absorbing member 253 at the other side to be engaged therewith.

Figure 17:
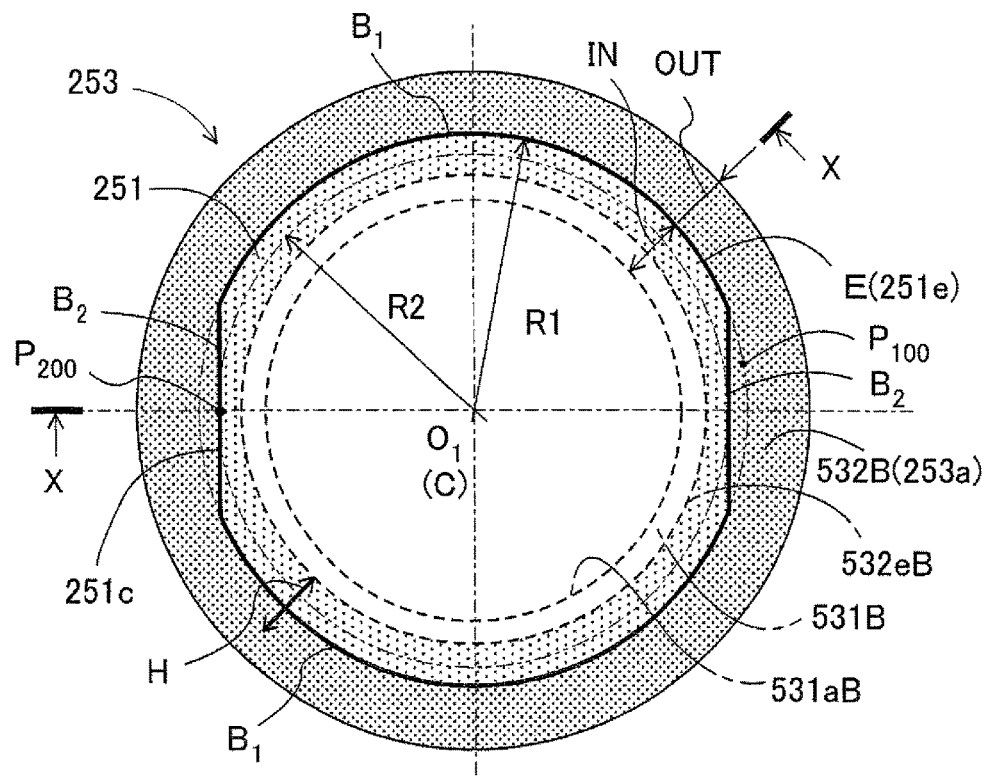
FIG. 17 is a view showing the relationship between the impact absorbing member and the large diameter portion of FIG. 16 seen in a radial direction.

A double width is formed at the end portion 511B of the large diameter portion 251 at the one side for engaging a tool, which rotates the one side end portion 511B upon engagement of the male screw portion 251b with the female screw portion 213B of the shaft portion 211B. (See FIG. 17). In other words, the shape of the outer brim portion 251e of the large diameter portion 251 is formed to be of non-perfect circle. It is noted that FIG. 17 is a view of the impact absorbing member 253 seen from the Y direction (See FIG. 16). FIG. 17 is an explanatory view explaining mainly the arrangement of the contact end surface 251a of the large diameter portion 251 and the end surface 532aB to be contacted of the flange portion 532B in a radial direction.

3-1-1. Impact Absorbing Member

The impact absorbing member 253 includes the impact receiving member 253a and the elastic body 253b. As similar to the above embodiment, the other side end surface 533aB of the elastic body 253b is adhered to the impact receiving member 253a and is integrally formed therewith. Further, the impact receiving member 253a includes the flange portion 532B and the cylindrical portion 531B. The length of the cylindrical portion 531B in an axial direction is decided to correspond to the compression displacement X3, as similar to the length thereof according to the above embodiment. The compression displacement X3 is decided to be the length smaller than the distance D3 between the end surface of the cylindrical portion 531B and the restricting surface 52b in the A-axis axial direction, as similar to the compression displacement X2 of the above embodiment. (See FIG. 19A). It is noted that FIG. 19A indicates the impact absorbing member 253 under non-deformed state and the symbol Pc in FIG. 19A designates the position in the A-axis direction of the end surface 532aB to be contacted of the flange portion 532B under non-deformed state.

Figure 18:
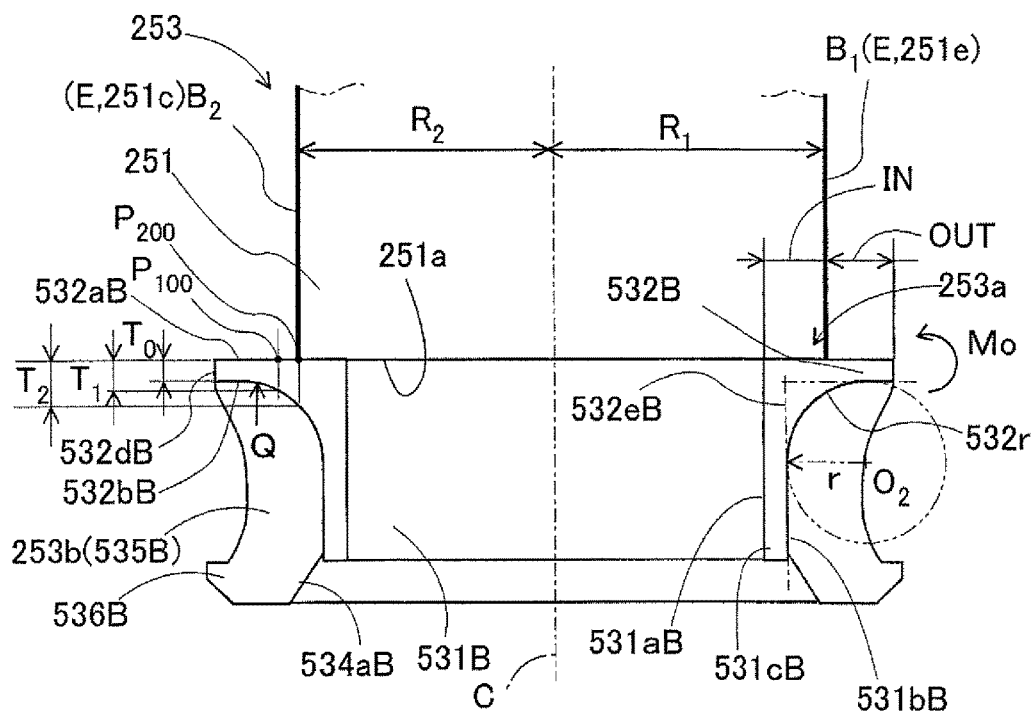
FIG. 18 is a cross sectional view taken along the line X-X of FIG. 17, wherein the relationship between the impact absorbing member and the large diameter portion seen along in an axial direction.

The cross section as viewed in the A-axis direction of the impact receiving member 253a is of L-shape and the inner corner portion (corner portion at inside) of the L-character is formed to be arch shaped recess and the outer corner portion (corner portion at outside) is formed with a right angle. As shown in FIG. 18, the arch shaped recess at the inner corner portion of the L-character has a curvature "r" and radius of the curvature "r" is slightly larger than the length from the inner end position 532eB (later explained in detail) of the flange portion 532B to a border position B1 outwardly in a radial direction. The impact receiving member 253a has a function to dampen the impact, as similar to the impact receiving members 53a, 63a and 153a according to the other embodiments.

FIG. 18 is across sectional view taken along the line X-X in FIG. 17, and mainly explaining the thickness of the flange portion 532B corresponding to the position in a radial direction. Both FIGS. 17 and 18 show the arrangement of each component and the operation position thereof and the rack shaft and the housing and several hatchings are omitted from the drawings.

The end portion 531cB of the cylindrical portion 531B at the one side has a straight shaped outer peripheral surface 531bB. However, the other side end portion of the cylindrical portion 531B is formed with the outer peripheral surface 531bB which has an arch shaped recess consecutively formed from the outer peripheral surface at the one end outwardly in a radial direction. The inner peripheral surface 531aB of the cylindrical portion 531B is provided with a through-hole through which the shaft portion 211B is inserted, under assembled state to the large diameter portion housing 52.

The flange portion 532B has an even plane shaped end surface 532aB to be contacted at the other side outer surface (end surface) which is contactable with the contact end surface 251a of the large diameter portion 251. The rear surface 532bB of the end surface 532aB to be contacted has two surfaces along in a radial direction, one surface being the arch shaped recessed surface formed consecutively from the outer peripheral surface 531bB of the cylindrical portion 531B at the inwardly in a radial direction and the other being the plane surface formed outwardly in a radial direction.

Assuming that the surface that the impact receiving member 253a is in contact with the large diameter portion 251, i.e., the end surface 532aB to be contacted of the flange portion 532B is defined to be the front surface, then assuming that viewing from the reverse surface side of the impact receiving member 253a, the cylindrical portion 531B is formed to be of a straight shape and that the flange portion 532B is formed to be of a flat shape, the flange portion 532B is enlarged in a radial direction relative to the cylindrical portion 531B and the radial position of the right angle corner which is the root of the vertically extending portion is defined to be the inner end position 532eB of the flange portion 532B. (See FIG. 18).

The outer brim portion E (border position B1, B2) indicated with a bold line in FIG. 17 is provided at the contact end surface 532aB to be contacted of the flange portion 532B. The border positions B1 and B2 correspond to the outer brim portion 251e (bold line E in FIG. 17) of the large diameter portion 251 which is in contact with the end surface 532aB to be contacted. Thus, similar to the shape of the outer peripheral brim portion 251e, the shapes of the border positions B1 and B2 are of non-perfect circle shape.

The border position B1 is in the form of an arch shape having a radius of R1 as shown in FIG. 17. The border position B1 is arranged at two portions facing with each other in up-down direction centering about the center axis of the arch. Further, the border position B2 is a pair of two straight line portions 251c corresponding to the double face width of the tool and is arranged at two portions, right and left side in parallel with each other. The distance between the each straight line portion 251c is set to be the value of "2×R2", wherein the radius R2 is smaller than the radius R1.

The rear surface 532bB of the flange portion 532B is provided with an arch shaped recessed surface portion 532r having a radius "r" of curvature contacting with the inner end position 532eB extending in the one side along in the A-axis direction. The arch shaped recessed surface portion 532r is formed consecutively from the plane surface positioned outwardly in a radial direction. Accordingly, the thickness of the flange portion 532B is gradually reduced outwardly in a radial direction within the range from the inner end position 532eB to the arch shaped recessed surface portion 532r until the position not to exceed the radius "r" thereof. Thus, the thickness of the flange portion 532B at the border position B1, B2 is set so that the thickness at the radial position of the inscribed circle having the radius of R2 of the border position B2 is thinner than the thickness at the radial position of the inscribed circle having the radius of R1 of the border position B2.

The elastic body 253b under non-deformed state will be explained. Similar to the elastic body 53b of the first embodiment, the elastic body 253b includes the cylindrical main body portion 535B and the annular projection portion 536B. The constricted recessed portion 535cB is provided at the central portion of the outer peripheral surface of the cylindrical main body portion 535B in the A-axis direction. The shape of the recessed portion 535cB is formed similar to the shape of the constricted recessed portion 535c of the cylindrical main body portion 535 according to the first embodiment and same effect thereof can be achieved. The annular projection portion 536B is formed at the one end side in the A-axis direction and is formed in a flange shape extending outwardly in a radial direction. The annular projection portion 536B is engaged with the annular groove 52d of the large diameter portion 52 (housing) extending from the restricting surface 52b outwardly in a radial direction. The shape of the annular projection portion 536B is similar to the shape of the annular projection portion 536 of the first embodiment and the same effect can be achieved.

The cylindrical main body 535B (elastic body 253b) is disposed within the initially set space $S_0$ formed by the inner peripheral surface 52c of the large diameter portion housing 52, the restricting surface 52b, outer peripheral surface 531bB of the cylindrical portion 531B and the flange portion 532B, having a gap S1 in a radial direction relative to the inner peripheral surface 52c of the large diameter portion housing 52.

As shown in FIG. 16, the other end surface 533aB of the elastic body 253b is adhered to the entire surface of the rear surface 532bB of the flange portion 532B. The other side end surface 533aB has an arch shaped recessed surface portion 532r of the rear surface 532bB and an end surface constantly flat along the rear surface from the arch shaped recessed surface portion 532r outwardly in a radial direction. Further, the inner peripheral surface 534B of the elastic body 253b is not adhered to the outer peripheral surface 531bB of the cylindrical portion 531B. The fixing structure of this embodiment also achieves the same effects as those of the first and the second embodiments as explained above.

The corner portion at the restricting surface side of the inner peripheral surface 534B of the elastic body 253b is provided with an enlarged diameter portion 534aB which diameter extends towards the restricting surface 52b side. The enlarged diameter portion 534aB achieves the same effects as those of the enlarged diameter portion 534a and 534aA of the first and the second embodiments.

When the large diameter portion 251 applies the impact force on the flange portion 532B, the flange portion 532B is formed with an inner peripheral side area IN which is brought into contact with the large diameter portion 251 and an outer peripheral side area OUT provided outwardly in a radial direction with respect to the inner peripheral side area IN and is not brought into contact with the large diameter portion 251 (See FIG. 17). At this time, the thickness of the outer peripheral side area OUT is set to be thinner than the thicknesses of the inner peripheral side area IN and the border positions B1 and B2.

In other words, as shown in FIG. 17, when the large diameter portion 251 applies the impact force on the flange portion 532B, a portion of the contact end surface 251a corresponding to the arc shaped portion at the outer peripheral brim portion 251e and the end surface 532aB to be contacted are brought into contact to form the border position B1. The border position B1 overlaps with a portion of the end surface 532aB along the radial position $P_{100}$ of the inscribed circle having the radius R1 and circumscribes the bold line E (outer peripheral brim portion 251e).

Further, a portion of the contact end surface 251a corresponding to the straight line portion in the outer peripheral brim portion 251e along the straight line portion 251c and the end surface 532aB to be contacted are brought into contact to form the straight line shaped border position B2. The border position B1 overlaps with a portion of the end surface 532aB along the radial position $P_{100}$ of the inscribed circle having the radius R1 and circumscribes the bold line E (outer peripheral brim portion 251e). The border position B2 is inscribed in the inscribed circle having the radius R2. Bordering the border positions B1 and B2, the inner peripheral side area IN which is brought into contact with the contact end surface 251a and the outer peripheral side area OUT which is not brought into contact with the contact end surface 251a are formed. The border position B2 defines the inner peripheral side area IN which is narrower than the border position B2 portion (arch portion) and the outer peripheral side area, which is wider than the arch portion. As shown in FIG. 17, the entire periphery of the outer peripheral brim portion 251e is formed by the positions B1, B2, B1 and B2 which are consecutively formed. The outer peripheral brim portion 251e is arranged within the area which is defined by the position further inwardly in a radial direction than the radial position $P_{100}$ along the circumscribed circle having the radius R1 and at the same time defined by the position further outwardly in a radial direction than the radial position $P_{200}$ along the inscribed circle having the radius R2. In other words, bordering the bold line E, the area positioned outwardly and in a radial direction relative thereto is defined to be the outer peripheral side area OUT and the area positioned inwardly and in a radial direction relative thereto is defined to be the inner peripheral side area IN.

The radius of curvature "r" of the arch shaped recessed surface portion 532r formed on the rear surface 532bB of the flange portion 532B is larger than the length from the inner end position 532eB of the flange portion 532B to the border position B1 outwardly in a radial direction. Accordingly, the area starting from the inner end position 532eB as the starting point towards outwardly in a radial direction by the radius of curvature "r" and within the outer peripheral side area OUT exceeding the border position B1, the thickness of the flange portion 532B corresponding to the arch shaped recessed surface portion 532r becomes gradually reduced towards outwardly in a radial direction. (Defined as "H" area in FIG. 17).

Accordingly, the thickness T0 of the flange portion 532B at the area of outer peripheral side area OUT further outward of the border position B1 is thinner than the thinnest thickness T1 at the radial position $P_{100}$ of the circumscribed circle having the radius R1 among the positions of the border positions B1 and B2 in the entire periphery corresponding to the outer peripheral brim portion 251e. Further, the thickness T0 of the flange portion 532B at the inner peripheral side area IN further inwardly in a radial direction than the outer peripheral side area OUT becomes the thinnest at the radial position $P_{100}$ along the circumscribed circle and the thickest at the radial position $P_{200}$ along the inscribed circle. In other words, regarding to the thickness of the flange portion 532B at the border positions B1 and B2 the thickness T1 of the radial position $P_{100}$ along the circumscribed circle at the border position B1 is thinner than the thickness T2 of the radial position $P_{200}$ along the inscribed circle at the border position B2.

Thus, the flange portion 532B has a structural feature wherein the thickness in the outer peripheral side area OUT is set to be thinner than the thickness in the border positions B1 and B2 of the inner peripheral side area IN and the outer peripheral side area OUT. According to this structure, when the elastic body 253b receives the impact force from the large diameter portion 251 to be compressively deformed, the inner pressure of the elastic body 253b is increased and the flange portion 532B receives such increase of the inner pressure of the elastic body 253b. Under the situation, even the flange portion 532B receives the force accompanied by this increase of the inner pressure from the elastic body 253b, the flange portion 532B can act against the force. The detail of such function will be explained hereinafter.

3-1-2. Operation

Figure 19A:
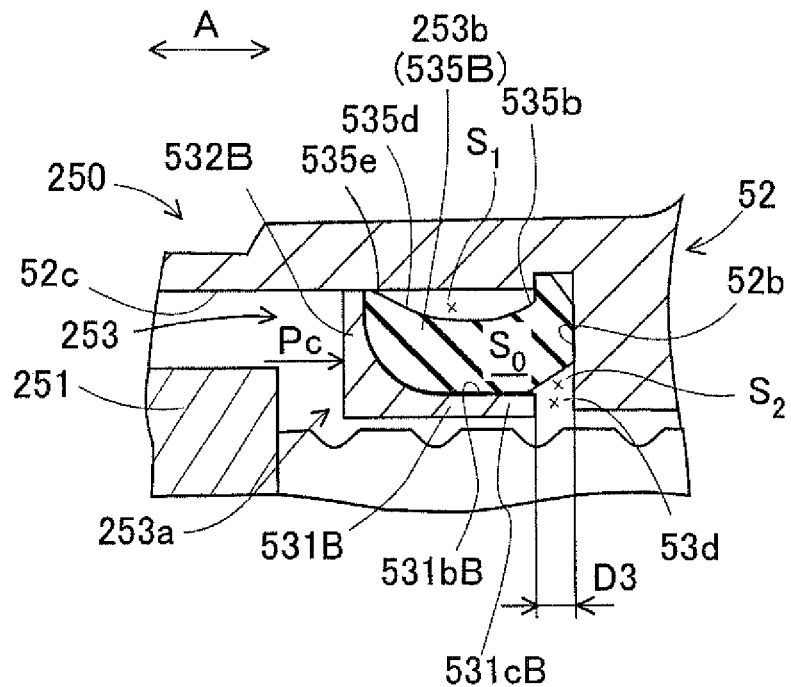
FIG. 19A is a cross sectional view showing the state of the damper device before the end abutting operation.
Figure 19B:
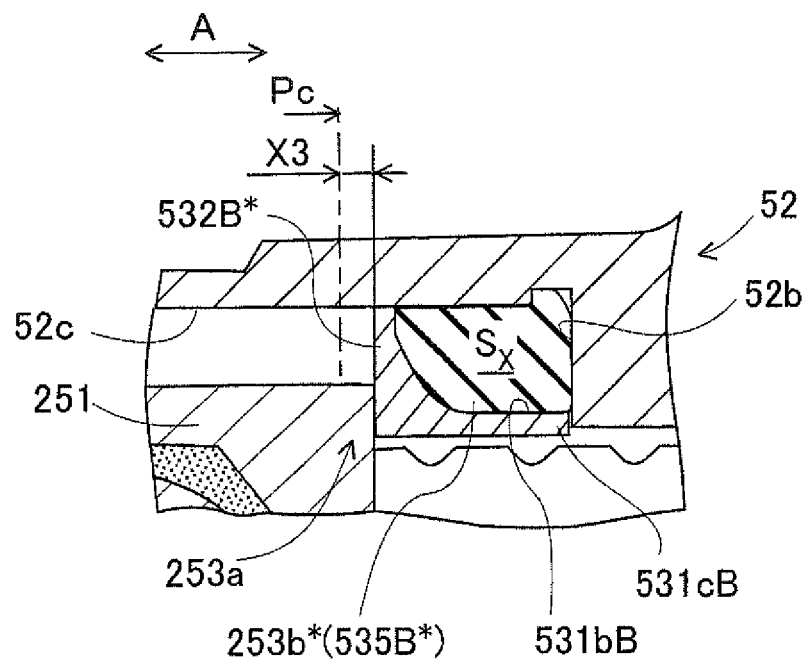
FIG. 19B is a cross sectional view showing the state of the damper device after the end abutting operation.

According to the structure above, when the impact force is applied to the impact receiving member 253a through the large diameter portion 251, the elastic body 253b is compressively deformed via the impact receiving member 253a (See FIGS. 19A and 19B). It is noted here that FIG. 19B indicates the impact absorbing member 253 under the state that the impact absorbing member 253 is compressed and is displaced by the compression displacement X3 in the A-axis direction. In FIG. 19B, the symbol Pc indicates the position of the end surface 532aB to be contacted of the flange portion 532B in the A-axis direction under the non-deformed state, as similar to the state illustrated in FIG. 19A.

Thus, the inner pressure Q of the compressed elastic body 253b increases and as shown in FIG. 18, the inner pressure Q influences on the flange portion 532B. In detail, the inner pressure Q influences on the area (area shown in FIG. 17 with gray dotted) from the inner end position 532eB extending outwardly in a radial direction up to the outer peripheral surface 532dB.

The outer peripheral side area OUT at further outside than the border positions B and B2 corresponding to the outer peripheral brim portion 251e of the large diameter portion 251 (area indicated with dark dotted in FIG. 17) is not brought into contact with (does not contact with) the contact end surface 251a which interferes the bending operation of the flange portion 532B. Accordingly, when the inner pressure Q of the elastic body 253b influences on the outer peripheral side area OUT, the elastic body 253b forms the cantilever such that the elastic body 253b with the border position B1 and B2 as a fulcrum point, applies a force on the flange portion 532B in a direction opposite to the compression direction. Then, a bending moment $M_0$ is applied on the flange portion 532B and the bending moment $M_0$ becomes maximum at the border position B1 and B2 (at the bold line E corresponding to the outer peripheral brim portion 251e) which is the fulcrum point. Further, among the border position B1 and B2, the largest moment is applied at the radial position $P_{200}$ which extends along the border position B2 corresponding to the straight lie portion 251c of the large diameter portion 251 and is in contact with the inscribed circle.

As explained above, the thickness T2 of the flange portion 532B corresponding to the radial position P200 of the inscribed circle becomes the thickest among the area including the entire periphery of the border positions B1 and B2 and the modulus of section is large and further the bending strength is improved. The thickness of the flange portion 532B is reduced gradually from the inner end position 532eB along the arch shaped recessed surface portion 532r. The thickness is not suddenly changed in the radial direction. Therefore, the area, where the arch shaped recessed surface portion 532r is provided, prevents the intense application of the stress by the bending moment $M_0$.

According to the embodiment above, the arch shaped recessed surface portion 532r is provided at the rear surface 532bB of the flange portion 532B. However, the invention is not limited to this arch shaped recessed surface and other structure such as non-arch shape can be applicable to the invention, as long as the thickness of the flange portion 532B is reduced gradually towards outwardly in a radial direction within the area from the inner end in a radial direction of the flange portion 532B to the position in a radial direction exceeding the border positions B1 and B2 of the inner peripheral side area IN and the outer peripheral side area OUT. Further, the large diameter portion 251 has a double width and non-perfect circle shape for engaging with the tool. However, the invention is not limited to the double width shape, for example, a hexagonal shape may be applicable, as long as the large diameter portion can be engaged with the tool. Further, the impact receiving member does not necessarily need to have the cylindrical portion, as long as such structure achieves the same effect.

4. Fourth Embodiment

4-1. Damper Device

Next, the damper device 350 according to the fourth embodiment will be explained. It is noted here that the damper device 350 according to the fourth embodiment includes a rack shaft 21 (corresponding to shaft), large diameter portion housing 52, 52 (housing) and impact absorbing member 353, 353. In detail, compared to the damper devices 53, 153, 253 of the first through third embodiments, the difference of the damper device 350 therefrom according to the fourth embodiment is that the flange portion 532C of the impact absorbing member 353 is arranged on the inner peripheral surface 52c of the large diameter portion housing 52, 52 through an elastic film 535a. Accordingly, the different points will be explained in detail and explanation of the other similar portions will be omitted. The same portions of the damper device according to the previous embodiments will be explained by referencing with the same numerals or symbols.

4-1-1. Impact Absorbing Member

Figure 20:
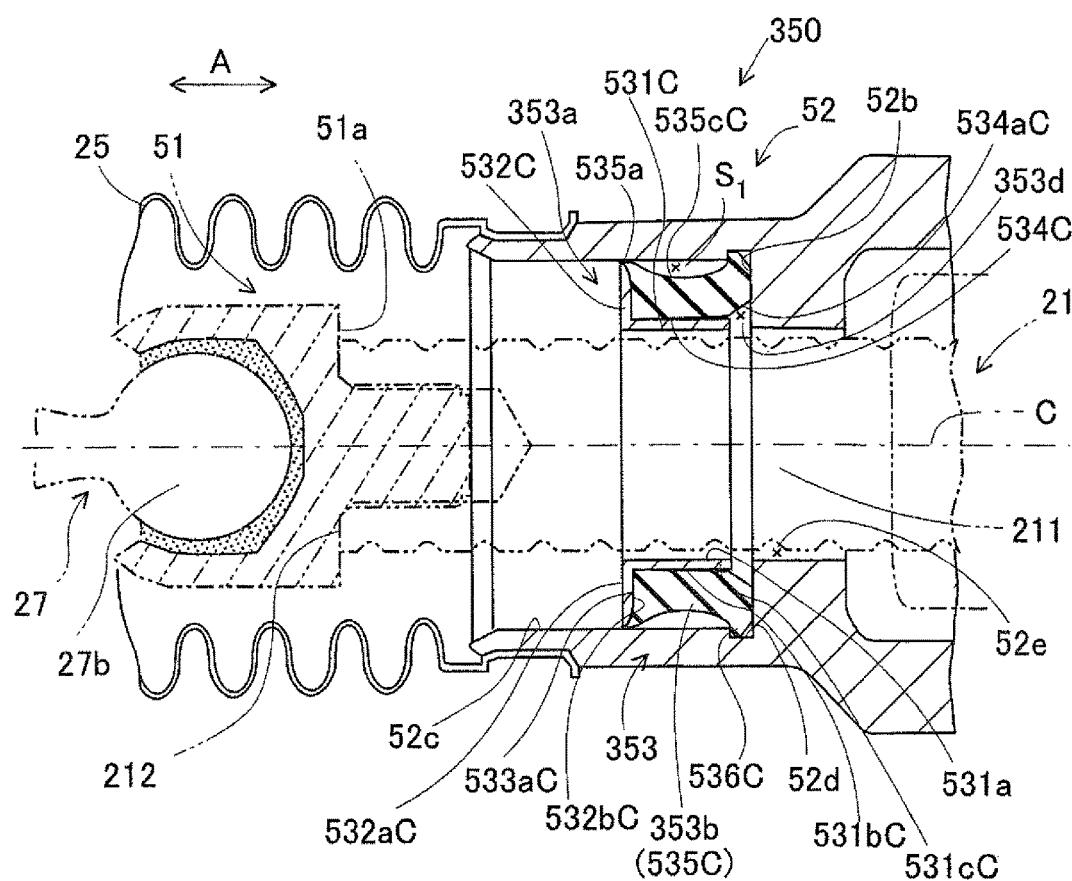
FIG. 20 is an enlarged cross sectional view of the structure of the damper device according to the fourth embodiment.

The impact absorbing member 353 includes the impact receiving member 353a, the elastic body 353b and the elastic film 535a. As shown in FIG. 20, the impact absorbing member 353 is formed by integrally adhering the other side end surface 533a of the elastic body 353b and the elastic film 535a to the flange portion 532C. The other side front surface (end surface) of the flange portion 532C forms the end surface 532aC to be contacted which is flat plane shaped and to be contactable with the large diameter portion 51.

Figure 21:
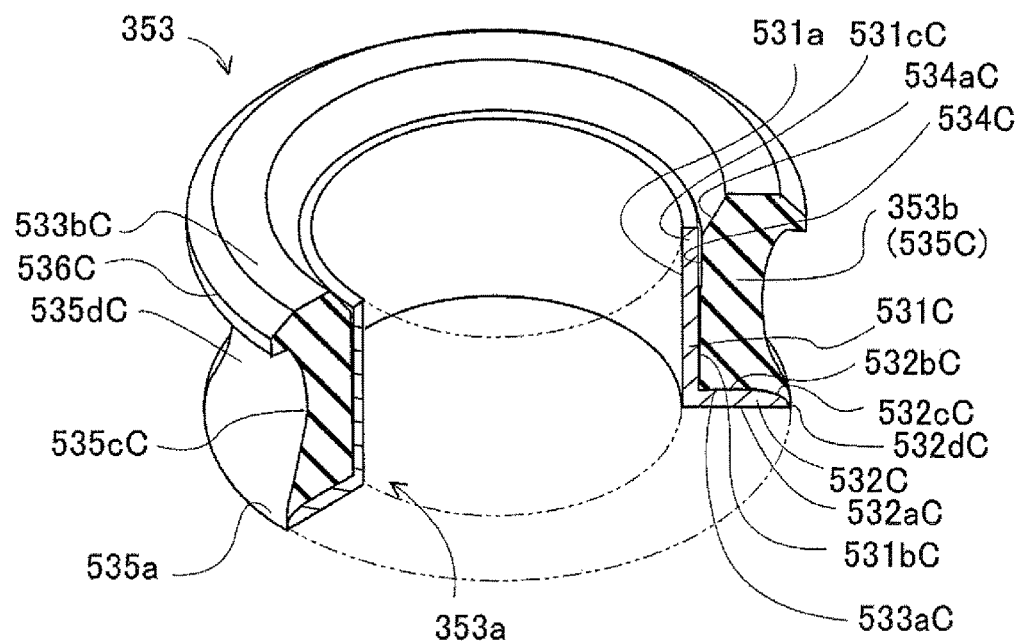
FIG. 21 is a perspective view showing a partial cross section of the impact absorbing member of FIG. 20.
Figure 23:
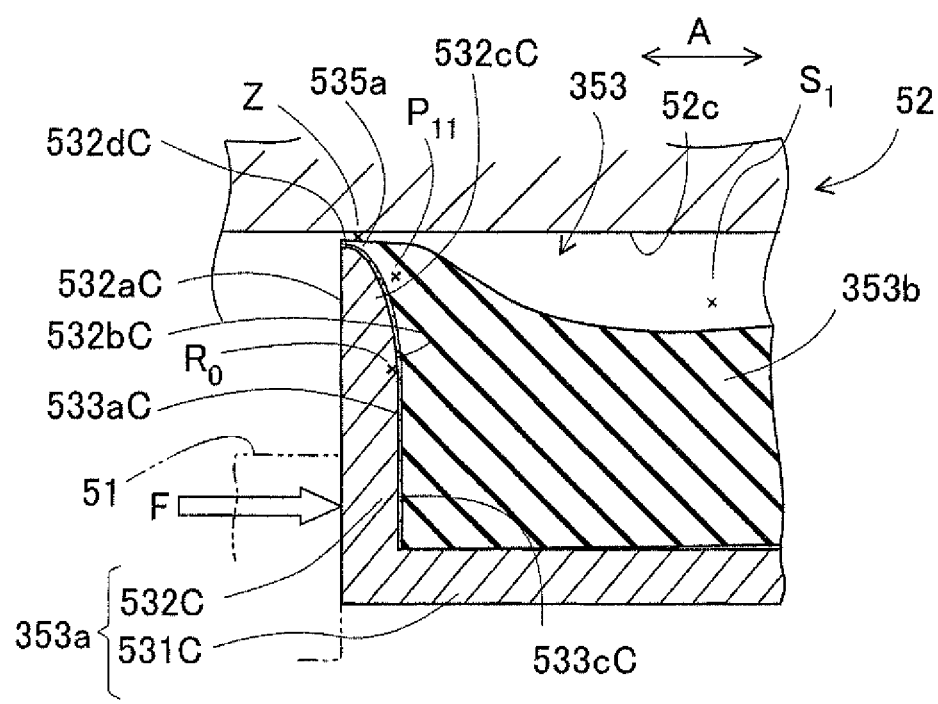
FIG. 23 is a partial cross sectional view of the enlarged flange portion of the impact absorbing member.

As shown in FIG. 21, the diameter of the corner portion 532cC of the outer peripheral surface 532dC at the one side (restricting surface side) of the flange portion 532C is reduced towards the restricting surface 52b (See FIG. 23). The corner portion 532cC is gradually reduced inwardly in a radial direction to form an arch shaped projection (R) in cross section along in the A-axis direction. One third of the flange portion 532C arranged outwardly in a radial direction is reduced gradually and smoothly outwardly in a radial direction to form inclination at the rear surface 532bC side of the end surface 532aC to be contacted.

Figure 22:
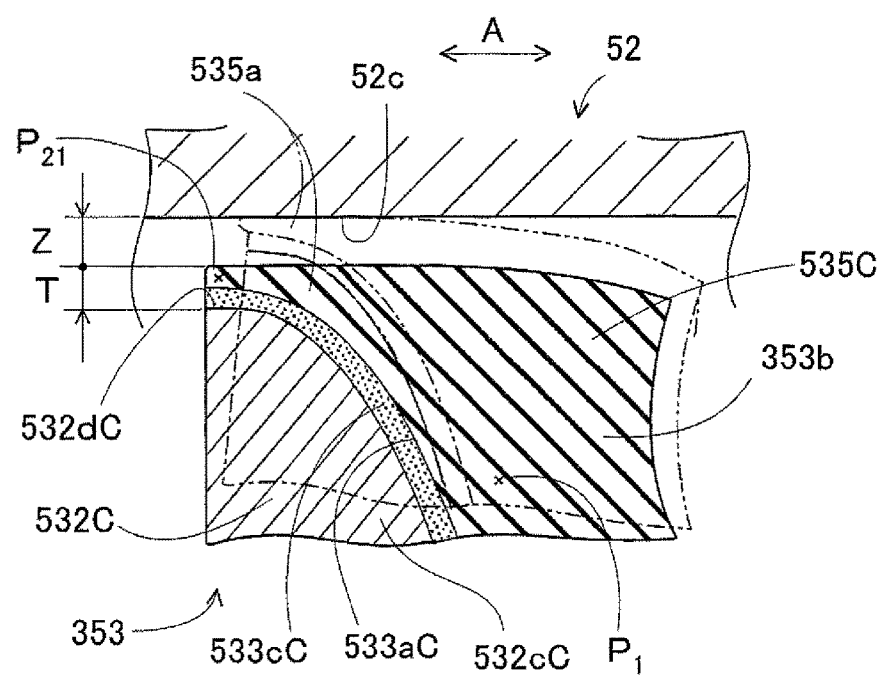
FIG. 22 is a partial cross sectional view of the enlarged contact portion of the elastic film.

Accordingly, as shown in FIGS. 22 and 23, the outer peripheral brim portion of the flange portion 532C forms the outer peripheral surface 532dC (end surface) consecutively formed to be tapered from the rear surface 532bC. The outer diameter of the flange portion 532C is formed so that the gap between the inner diameter of the inner peripheral surface 52c of the large diameter portion 52 and the outer peripheral surface 532dC of the flange portion 532C becomes minimum.

Next, the elastic body 353b under the non-deformed state will be explained hereinafter. The elastic body 353b includes the cylindrical main body portion and the annular projection portion 536C, as similar to the elastic body 53b and 253b of the previous embodiments. The cylindrical main body portion 535C is formed with a constricted recessed portion 535cC at the central portion of the outer peripheral surface in the A-axis direction. The recessed portion 535cC has the shape similar to the shape of the recessed portion 535c of the cylindrical main body portion 535 according to the first embodiment and the same effect thereof can be achieved. The annular projection portion 536C is formed at the one end side in the A-axis direction to be of a flange shape extending outwardly in a radial direction. The annular projection portion 536C is engaged with the annular groove 52d of the large diameter portion housing 52 (housing) extending from the restricting surface 52b outwardly in a radial direction. The shape of the annular projection portion 536C is similar to the shape of the annular projection portion 536 of the first embodiment and the same effect can be achieved.

Then, the other side end surface 533aC of the elastic body 353b is adhered to the rear surface 532bC of the flange portion 532C. Further, the elastic film 535a is integrally formed on the outer peripheral surface 532dC of the flange portion 532C with the other side end surface 533aC. The elastic film 535a is formed consecutively with the other side end surface 533aC to form a corner portion of the other side of the outer peripheral surface 535dC of the elastic body 353b. As similar to the adhesion method of the previous embodiments, the adhesion is carried out on the entire surface of the contactable rear surface 532bC and the outer peripheral surface 532dC.

The gap Z in a radial direction between the elastic film 535a which covers the outer peripheral surface 532dC and the inner peripheral surface 52c of the large diameter portion housing 52 corresponds to the minimum gap among the gap S1 in a radial direction between the cylindrical main body portion 535C and the inner peripheral surface 52c of the large diameter portion housing 52. It is noted here that the elastic film 535a is explained as a portion of the elastic body 353b (corner portion of the other side outer peripheral surface 535dC of the elastic body 353b).

The adhesion portion 533cC is formed on the entire surface of the rear surface 532bC of the flange portion 532C to ensure the maximum available adhesion area. The adhesion portion 533cC is formed consecutively from the corner portion 532cC of the flange portion 532C along the outer peripheral surface 532dC. Accordingly, the outward in a radial direction of the other side end surface 533aC consecutively covers the outer peripheral surface 532dC of the flange portion 532C by making a curved surface along the R-shape of the corner portion 532cC.

The elastic film 535a corresponds to the corner portion formed by the other side end surface 533aC of the elastic body 353b and the outer peripheral surface 535dC and is positioned along the corner portion 532cC of the flange portion 532C and the outer peripheral surface 532dC. The other side end surface 533aC is formed consecutively with the inner peripheral surface of the elastic film 535a which covers the outer peripheral surface 532dC. The thickness of the elastic film 535a facing to the inner peripheral surface 52c of the large diameter portion housing 52 in a radial direction becomes thinnest (thickness T) at the portion covering the outer peripheral surface 532dC of the flange portion 532C. The thickness of the elastic film 535a becomes gradually thicker from the outer peripheral surface 532dC towards the restricting surface 52b until the end portion which is the corner portion 532cC (starting point to form R shaped curved surface, designated as R0 in FIG. 23).

As shown in FIG. 22, the thickness T of the elastic film 535a which covers the outer peripheral surface 532dC of the flange portion 532C at the thinnest portion is about 0.3 (mm) (including the adhesion portion 533cC). The gap Z in a radial direction between the elastic film 535a and the inner peripheral surface 52c of the large diameter portion housing 52 is set to be from 0.15 to 0.6 (mm) when the both portions are positioned closest to each other. The outer peripheral surface 535dC at the other side (elastic film 535a side) of the elastic body 353b covers the entire peripheral surface of the outer peripheral surface of the outer peripheral surface 532dC through the adhesion portion 533cC.

Further, as similar to the first through third embodiments, the inner peripheral surface 534C of the elastic body 353b is loosely inserted into the cylindrical portion 531C via a slight gap therebetween. In other words, the inner peripheral surface 534C of the elastic body 353b is not adhered to the outer peripheral surface 531bC of the cylindrical portion 531C. Therefore, the same effect can be achieved as those of the first through third embodiments. The enlarged diameter portion 534aC which diameter is enlarged towards the restricting surface side is formed at the corner portion at the restricting surface side of the inner peripheral surface 534C of the elastic body 353b. The enlarged diameter portion 534aC is formed similar to those of the first through third embodiments and the effect thereof can be achieved as those of the first through third embodiments.

4-1-2. Operation

Figure 24A:
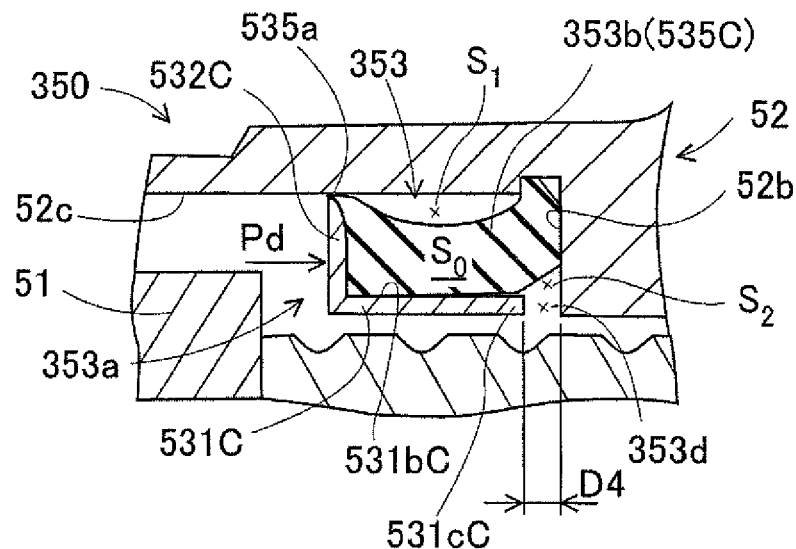
FIG. 24A is a cross sectional view of the damper device before the end abutting operation.
Figure 24B:
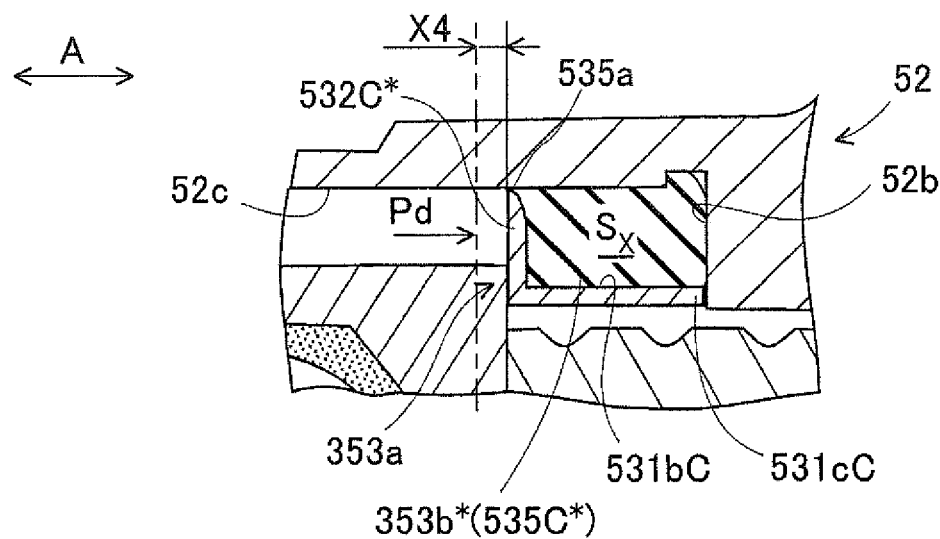
FIG. 24B is a cross sectional view of the damper device after the end abutting operation.

According to the structure above, when the impact force is applied on the impact receiving member 353a by the large diameter portion 51, the elastic body 353b is compressed through the impact receiving member 353a (See FIGS. 24A and 24B). It is noted that FIG. 24A illustrates the impact absorbing member 353 under the non-deformed state and FIG. 24B illustrates the impact absorbing member 353 which has been compressed and displaced by the distance X4 in the A-axis direction. The symbol Pd in FIGS. 24A and 24B indicates the position of the end surface 532aC to be contacted in the A-axis direction under non-deformed state.

Under the state illustrated in FIG. 24A, the impact absorbing member 353 is disposed inside of the initially set space S0. The opening portion 353d having the distance D4 in the A-axis direction which is longer than the compression displacement X4 is provided between the end surface of the end portion 531cC of the cylindrical portion 531C and the restricting surface 52b.

The flange portion 532C is provided at the end portion of the impact absorbing member 353 at the other side. The flange portion 532C is a contact portion, which directly receives the collision impact from the large diameter portion 51 in the impact absorbing member 353. Accordingly, the flange portion is made from the heavy metal material having a high rigidity. Accordingly, when the flange portion 532C is displaced in a radial direction due to the vehicle vibration or the like, by the engagement between the annular projection portion 536C and the annular groove 52d at the other side which is apart from the fixed one side. Thus the displacement in a radial direction of the flange portion 532C is easy to be increased.

When the flange portion 532C of the impact absorbing member 353 is displaced in the radial direction due to the vehicle vibration or the like to close the gap Z in the radial direction and is collided with the inner peripheral surface 52c of the large diameter portion housing 52, the flange portion 532C is brought into contact with the inner peripheral surface 52c via the elastic film 535a. (See two-dot chain line in FIG. 22). Thus, the elastic film 535a absorbs the metal-to-metal collision impact between the outer peripheral surface 532dC of the flange portion 532C and the inner peripheral surface 52c of the large diameter portion housing 52 and reduces the contact noise (dampening of the sound pressure). The film thickness of the elastic film 535a opposing to the inner peripheral surface 52c of the large diameter portion housing 52 becomes gradually thicker from the portion that is the thinnest film (thickness T) covering the outer peripheral surface 532dC of the flange portion 532C towards the restricting surface 52b to reach the end portion (R-shaped curved surface) forming the corner portion 532cC. This can largely achieve the effect of reduction of the contact noise.

Further, when the large diameter portion 51 does not apply impact force on the flange portion 532C, the cylindrical main body portion 535C of the elastic body 353b is disposed in the inner peripheral surface 52c of the large diameter portion housing 52 having a gap $S_1$ in a radial direction. Further, the elastic body 53b is disposed having a gap S2 on an outer peripheral surface of the cylindrical portion 531, which is an imaginal outer peripheral surface formed assuming that the end surface 531d of the cylindrical portion 531 extends to be in contact with the restricting surface 52b (See FIG. 24A).

When the large diameter portion 51 applies the impact force on the flange portion 532C, the cylindrical main body portion 535C is deformed in the A-axis direction by the restricting surface 52b and the flange portion 532C to fill up the space occupied by the gaps $S_1$ and $S_2$. Thus, the cylindrical main body portion 535C* after compressive deformation is filled in the compression space Sx by the compression displacement X4 (<distance D4).

As explained, during the process of compression of the elastic body 353b, the portion from the end surface 533aC at the other side of the elastic body 353b consecutively continuing to the elastic film 535a is formed to be a gradual R shape continuing from the corner portion 532cC of the flange portion 532C to the outer peripheral surface 532dC as shown in FIG. 23. Accordingly, when the impact force F is applied through the flange portion 532C by the large diameter portion 51, the stress generated thereby is not concentrated at a portion near the corner portion P11 formed by the elastic body 353b or the elastic film 535a integrally formed therewith. Therefore, the stress generated at the curved surface vicinity corner portion $P_{11}$ which covers the corner portion 532cC of the flange portion 532C that may become the starting point of flowing of the rubber like elastic film 535a can be reduced upon compressive deformation of the elastic body 353b. Thus, the portion (in FIG. 22, indicated by a symbol $P_{21}$) of the elastic film 535a which covers the outer peripheral surface 532dC of the flange portion 532C in the A-axis direction can be prevented from flowing out by enclosing the peripheral surface 532dC of the flange portion 532C upon compressive deformation of the elastic body 353b.

Further, the elastic film 535a of the elastic body 353b which covers the outer peripheral surface 532dC of the flange portion 532C is adhered to the outer peripheral surface 532dC of the flange portion 532C. The contact noise can be reduced by the impact absorbing member 353. Thus, the gap Z in the radial direction between the inner peripheral surface 52c of the large diameter portion housing 52 and the elastic film 535a having the film thickness T can be lessened as much as possible. In other words, the outer diameter of the flange portion 532C can be enlarged and a large compressive space Sx which does not have the gap for communication with the exterior can be largely provided. The occupying ratio of the elastic body 353b in the space Sx can be increased and therefore the impact absorbing function becomes high.

Figure 25:
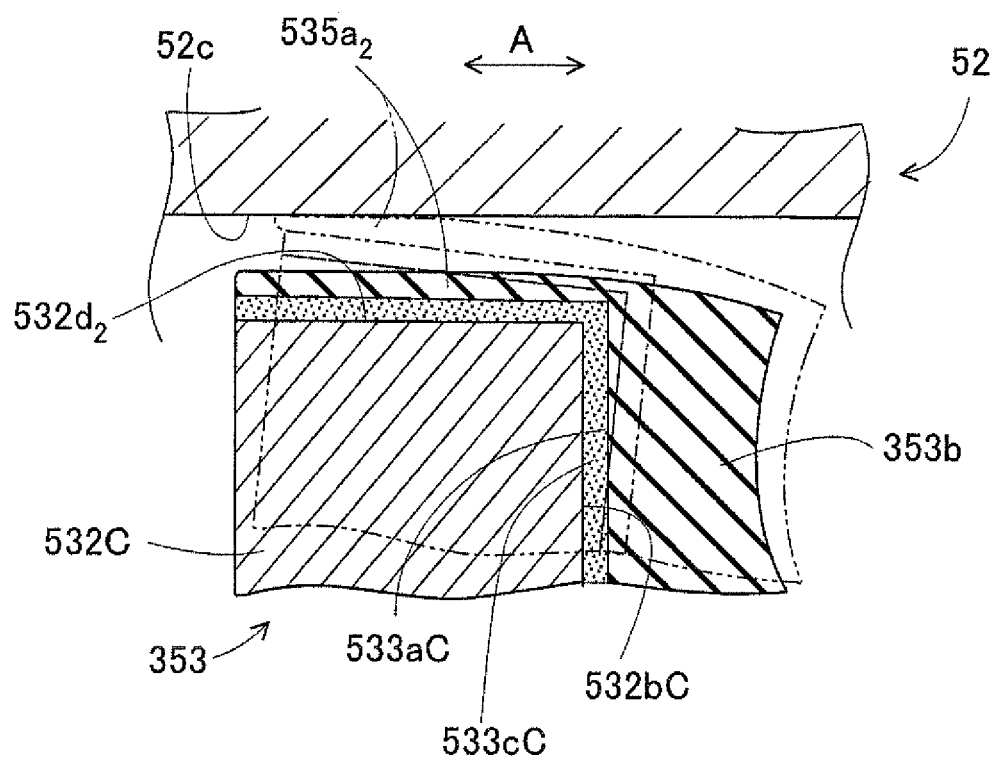
FIG. 25 is a partial cross sectional view of the enlarged contact portion of the elastic film of the damper device according to a modified embodiment.

The invention is not limited to the structures as explained above and the corner portion 532cC may not be provided at the rear surface 532bC of the flange portion 532C, as shown in FIG. 25. In such modified embodiment, the outer peripheral surface 532d2 of the flange portion 532C can be brought into contact with the inner peripheral surface 52c of the housing through the elastic film 535a2 (See two dot chain line in FIG. 25). Thus, the metal-to-metal collision impact generated between the outer peripheral surface 532d2 of the flange portion 532C and the inner peripheral surface 52c of the large diameter portion housing 52 can be absorbed, thereby absorbing the contact noise. It is noted that the components of the impact absorbing member 353 corresponding portions are referenced as the same symbols.

5. Effects of the Embodiments

According to the first through fourth embodiments of the invention, the damper device 50, 150, 250 and 350 includes the shaft 21,221 formed by the shaft portion 211 and the large diameter portion 51, 251 and a large diameter portion housing 52 (housing 22) formed in a cylindrical shape and through which the shaft 21 is inserted for a slidable movement thereof in an axial direction (A-axis direction) relative to the housing. The large diameter portion housing 52 (housing 22) is provided with a restricting surface 52b facing toward a contact end surface 51a, 251a (end surface) of the large diameter portion 51, 251 in the axial direction and an impact absorbing member 53, 153, 253 and 353 inserted into the shaft portion 211 and disposed between an end surface 51a, 251a (end surface) and the restricting surface 52b in the axial direction. The impact absorbing member 53, 153, 253 and 353 includes an impact receiving member 53a, 153a, 253a and 353a which is provided with a cylindrical portion 531, 531A, 531B and 531C facing to an inner peripheral surface 52c of the large diameter portion housing 52 (housing 22) and a flange portion 532, 532A, 532B and 532C, extending from the cylindrical portion 531, 531A, 531B and 531C outwardly in a radial direction, facing to the restricting surface 52b and being contactable with the large diameter portion 51, 251 and an elastic body 53b, 153b, 253b and 353b provided in a space formed by the inner peripheral surface 52c of the large diameter portion housing 52 (housing 22), the restricting surface 52b, an outer peripheral surface of the cylindrical portion 531, 531A, 531B and 531C and the flange portion 532, 532A, 532B and 532C and formed by a rubber material or a synthetic resin material having a rubber-like elasticity.

when the large diameter portion 51, 251 does not apply an impact force on the flange portion 532,532A, 532B and 532C, the elastic body 53b, 153b, 253b and 353b is disposed at least at one of the inner peripheral surface 52c of the large diameter portion housing 52 (housing 22) and the outer peripheral surface 531b, 531bB and 531bC of the cylindrical portion 531, 531A, 531B and 531C having a gap S1 through S4. When the large diameter portion 51, 251 applies the impact force on the flange portion 532,532A, 532B and 532C, the elastic body 53b, 153b, 253b, 353b is deformed by the restricting surface 52b and the flange portion 532,532A, 532B and 532C in the axial direction and deformed to be brought into contact with all of the inner peripheral surface 52c of the large diameter portion housing 52 (housing 22), the restricting surface 52b, the outer peripheral surface 531b, 531bB and 531bC of the cylindrical portion 531, 531A, 531B and 531C and the flange portion 532,532A, 532B and 532C so that the gap S1 through S4 is filled with the elastic body. The impact receiving member 53a, 153a, 253a and 353a is restricted from a relative movement relative to the large diameter portion housing 52 (housing 22), by the deformed elastic body 53b, 153b, 253b and 353b under the impact receiving member being kept to be a non-contact state relative to the restricting surface 52b.

Thus, compared to the conventional structure where the impact receiving member restricts the relative movement of the impact absorbing member relative to the large diameter portion housing 52 by the collision with the large diameter portion housing 52, according to the above structure of the embodiments, the elastic body 53b, 153b, 253b and 353b which rigidity has been improved continues to be disposed between the large diameter portion housing 52 and the impact receiving member 53a, 153a, 253a and 353a. Therefore, the increasing ratio of the impact force to be transmitted to each component of the device can be reduced and accordingly, the setting of load resistance for each component can be minimized to thereby perform cost reduction of the device as a whole.

According to the first through fourth embodiments, an enlarged diameter portion 534, 534a, 534aA, 534aB and 534aC which diameter is enlarged towards the restricting surface 52b is provided at a corner portion of an inner peripheral surface 534, 534A, 534B and 534C of the elastic body 53b, 153b, 253b and 353b at a restricting surface 52b side thereof.

According to the structure above, the enlarged diameter portion 534a, 534aA, 534aB and 534aC can restrict the compressive deformation of the elastic body 53b, 153b, 253b and 353b, such that the elastic body 53b, 153b, 253b and 353b expands outwardly from the initially set space S0, when the large diameter portion 51, 251 applies the impact force on the flange portion 532, 532A, 532B and 532C. Thus, the enlarged diameter portion 534a, 534aA, 534aB and 534aC is prevented from being bitten in between the end surface of the end portion 531c of the cylindrical portion 531, 531A, 531B and 531C and the restricting surface 52b. Accordingly, the deterioration of the elastic body 53b can be avoided to improve the durability.

According to the first through fourth embodiments, the enlarged diameter portion 534a, 534aA, 534aB and 534aC is formed with an inclination from an end portion 531c, 531cA, 531cB and 531cC of the cylindrical portion 531, 531A, 531B and 531C towards the restricting surface 52b, or from a position further flange portion 532, 532A, 532B and 532C side from the end portion 531c, 531cA, 531cB and 531cC of the cylindrical portion 531, 531A, 531B and 531C towards the restricting surface 52b, when the elastic body 53b, 153b, 253b and 353b is under non-deformed state and under the state that the elastic body is kept in contact with the restricting surface 52b and the flange portion 532, 532A, 532B and 532C.

According to the structure above, the cylindrical portion 531, 531A, 531B and 531C can surely restrict the compressive deformation of the enlarged diameter portion 534a, 534aA, 534aB and 534aC, such that the enlarged diameter portion 534a, 534aA, 534aB and 534aC expands outwardly from the initially set space S0, when the large diameter portion 51, 251 applies the impact force on the flange portion 532, 532A, 532B and 532C.

According to the first through fourth embodiments, the elastic body 53b, 153b, 253b and 353b is provided under an adhesion state to the flange portion 532, 532A, 532B and 532C and under a non-adhesion state to the cylindrical portion 531, 531A, 531B and 531C, the restricting surface 52b and the inner peripheral surface 52c of the large diameter portion housing 52.

According to the structure above, concentration of stress is generated on the end surface 533a, 533aA, 533aB and 533aC of the elastic body 53b, 153b, 253b and 353b at the other side, where the adhesion (vulcanization) portion with the flange portion 532, 532A, 532B and 532C and stress generation in the vicinity of the inner and outer peripheral surfaces other than at the end surface 533a, 533aA, 533aB and 533aC can be suppressed. Thus, the deterioration of the elastic body can be prevented and the durability of the device can be improved by avoiding the abuses such as for example, the compressive deformation in the direction where the elastic body expands out from the initially set space S0 staring from the stress generation portion as a starting point, being bitted in or abrasions, which would be the causes of the deterioration.

According to the damper device 150 of the second embodiment, the large diameter portion housing 52 (housing) is provided with an annular groove 52d formed at the inner peripheral surface 52c. Further, the elastic body 153b is provided with a cylindrical main body portion 535A disposed between the restricting surface 52b and the flange portion 532A and a projection portion 536A be suppressed. Further, the impact absorbing member 153 is provided with an annular projecting protection plate 153c embedded in the cylindrical main body portion 535A and is arranged inwardly in a radial direction relative to the projection portion 536A.

Further, the cylindrical main body portion 535A is disposed in a space formed by the inner peripheral surface 52c of the large diameter portion housing 52 (housing), the projecting protection plate, 153c, the outer peripheral surface 531b of the cylindrical portion 531A and the flange portion 532A. Further, an end surface 533aA of the cylindrical main body portion 535A facing to the flange portion 532A is adhered to the flange portion 532A and an inner peripheral surface 534A of the cylindrical main body portion 535A facing to the outer peripheral surface 531b of the cylindrical portion 531A is not adhered to the outer peripheral surface 531b of the cylindrical portion 531A. Further, when the large diameter portion 51 does not apply the impact force on the flange portion 532A, the cylindrical main body portion 535A is disposed having a gap at least one of the inner peripheral surface 52c of the large diameter portion housing 52 (housing) and the outer peripheral surface 531b of the cylindrical portion 531.

According to the structure above, the elastic body 153b of the impact absorbing member 153 includes a projection portion 536A which has a falling prevention function in the A-axis direction and the cylindrical main body portion 535A which has a dampening function for absorbing the impact inputted by the axial compression. The projecting protection plate 153c is disposed between the projection portion 536A and the cylindrical main body portion 535A. The stress generated inside of the cylindrical main body portion 535A by the displacement of the impact absorbing member 153 by the collision of the large diameter portion 51 which corresponds to the "end portion" of the rack shaft 21 (shaft) with the impact receiving member 153a of the impact absorbing member 153 and by the compression of the cylindrical main body portion 535A would not largely influence on the projection portion 536A due to a sheltering effect of the projecting protection plate 153c. Thus, the concentration of stress at the projection portion 536A can be suitably avoided to prevent the projection portion 536A from damage. Further, the corner portion (enlarged diameter portion 534aA) at the further inner peripheral surface side of the projecting protection plate 153c at the cylindrical main body portion 535A is prevented from movement of the body in the cylindrical main body portion 535A by the projecting protection plate 153c. Therefore, no expansion of a portion of the cylindrical main body portion 535 between the end surface 531c1A (end portion) of the cylindrical portion 531 and the restricting surface 52b. Accordingly, no biting-in of the expanded portion of the cylindrical main body portion 535 occurs between the end surface 531c1A and the restricting surface 52b.

Further, according to the second embodiment, the cylindrical portion 531A and the projecting protection plate 153c are overlapping with each other in the A-axis direction (in an axial direction) by the distance OL under the cylindrical main body portion 535A being non-deformed state. According to this structure, the cylindrical portion 531A can physically interfere the expansion of a portion of the cylindrical main body portion 535A and such expansion of the portion of the cylindrical main body portion 535A between the end surface 531c1A of the cylindrical portion 531A and the restricting surface 52b can be further suppressed.

According to the third embodiment, when the large diameter portion 51 applies the impact force on the flange portion 532B, the flange portion 532B includes an inner peripheral side area IN in which the flange portion 532B contacts with the large diameter portion 51 and an outer peripheral side area OUT which is positioned further outwardly in a radial direction than the inner peripheral side area IN and in which the flange portion 532B does not contact with the large diameter portion 51. Further, the thickness of the outer peripheral side area OUT is formed to be thinner than the thickness of a border position B1, B2 of the inner peripheral side area IN and the outer peripheral side area OUT.

According to the structure above, when the large diameter portion 251 applies the impact force on the flange portion 532B and the elastic body 253b is compressed and the inner pressure Q generated by the compression of the elastic body 253b influences on the outer peripheral side area OUT, the elastic body 253b forms the cantilever such that the elastic body 253b with the border position B1 and B2 as a fulcrum point, applies a force on the flange portion 532B in a direction opposite to the compression direction. However, the thickness T2 of the flange portion 532B is sufficiently thick among the area of the entire periphery including the border position B1 and B2 and the flange portion 532B has a large section modulus and the bending strength is improved. Therefore, the bending of the flange portion 532B can be suitably suppressed.

According to the third embodiment, the large diameter portion 251 and the flange portion 532B are arranged coaxially with each other in the axial direction (A-axis direction), the shape of an outer peripheral brim portion of the large diameter portion 251 which contacts with the flange portion 532B is formed to be of a non-perfect circle and the shape of the border position B1, B2 of the inner peripheral side area IN and the outer peripheral side area OUT of the flange portion i532B is formed to be of a non-perfect circle corresponding to a non-perfect circle shape of the outer peripheral brim portion 251e of the large diameter portion 251 and wherein the thickness of the border position B1, B2 is set such that a radial position $P_{100}$ of a circumscribed circle at the border position B1 is thinner than a radial position $P_{200}$ of an inscribed circle at the border position B2. Accordingly, when the flange portion 532B is not a perfect circle, a higher section modulus can be surely set to the portion where the bending moment $M_0$ by the elastic body 253b having the inner pressure Q. This can achieve the highly assured bending strength improvement.

Further, according to the fourth embodiment, the impact absorbing member 353 is adhered to the entire periphery of the outer peripheral surface 532dC of the flange portion 532C, arranged having a gap Z in a radial direction relative to the inner peripheral surface 52c of the large diameter portion housing 52 and is formed with an elastic film 535a formed by a rubber material or a synthetic resin material having a rubber like elasticity. Accordingly, when the flange portion 532C is displaced in a radial direction due to the vehicle vibration or the like, the elastic film 535a is brought into contact with the inner peripheral surface 52c of the large diameter portion housing 52. Therefore, the flange portion 532 does not directly contact with the large diameter portion housing 52 and the contact noise can be suppressed.

According to the fourth embodiment, a corner portion 532cC of the outer peripheral surface 532dc of the flange portion 532C at the restricting surface 52b side is formed such that the diameter of the corner portion 532cC is reduced towards the restricting surface 52b. The elastic body 353b is adhered to the flange portion 532C and the elastic film 535a is integrally formed with the elastic body 353b. Therefore, concentration of stress in the vicinity of the corner portion P11 or at the corner portion P11 of the elastic film 535a which covers the corner portion 532cC can be avoided when the elastic body 353b is compressed. Thus, the durability of the elastic body 353b and accordingly the impact absorbing member 353 can be improved.

According to the first through fourth embodiments, the steering device ST equipped with the damper device 50, 150, 250, 350 includes a rack shaft 21 connected to steered wheels 26, 26 via tie rods 24, 24 at both ends thereof and is reciprocally movable in an axial direction to turn the steered wheels 26, 26, the rack shaft 21 including the large diameter portions 51, 51 provided at both ends of the rack shaft 21 as the large diameter portion 51, to which the tie rods 24, 24 are pivotally connected and a housing for accommodating the rack shaft 21 as the large diameter portion housing 52. Thus, the steering device ST which is equipped with one of the damper devices 50, 150, 250, 350 can exhibit each effect which is achieved by each damper device.

Obviously, numerous modifications and variations of the present invention are possible in light of the above teachings. It is therefore to be understood that within the scope of the appended claims, the present invention may be practiced otherwise than as specifically described herein.

EXPLANATION OF SIGNS AND SYMBOLS

21, 221; shaft (rack shaft), 22; housing, 26; steered wheel, 50, 60, 150, 250, 350; damper device, 51, 251; large diameter portion, 51*a*, 251*a*; contact end surface, 52; large diameter portion housing (housing), 53, 63, 153, 253, 353; impact absorbing member, 53*a*, 63*a*, 153*a*, 253*a*, 353*a*; impact receiving member, 53*b*, 53*b*2, 153*b*, 253*b*, 353*b*; elastic body, 53*d*, 53*d*1; opening portion, 153*c*; projecting protection plate, 153*c*2; end surface at the other side (one side end surface), 213, 213B; female screw portion, 531, 531A, 531B, 531C; cylindrical portion, 532, 532A, 532B, 532C; flange portion, 533*c*, 633*c*2, 533*c*C; adhesion portion, 534*a*, 534*a*A, 534*a*B, 534*a*C; enlarged diameter portion, 535, 5352, 535A, 535B, 535C; cylindrical main body portion, 535A1; annular groove, 635*c*, 535*c*A, 535*c*, 535*c*C; recessed portion, 536, 536B, 536C; annular projection portion, 536A; projection portion, D1, D2, D3, D4; distance, S0, S02; initially set space, S1, S2, S3, S4; gap, ST: steering device, X1, X2, X4, X4; compression displacement.

The invention claimed is:

1. A damper device comprising:
    a shaft including a shaft portion and a large diameter portion;
    a cylindrical housing in which the shaft is disposed and slidably movable with respect to the housing in an axial direction, the housing having a restricting surface facing an end surface of the large diameter portion in the axial direction; and
    an impact absorbing member disposed onto the shaft portion and between the end surface of the large diameter portion and the restricting surface in the axial direction, the impact absorbing member including:
        an impact receiving member including:
            a cylindrical portion facing an inner peripheral surface of the housing, and
            a flange portion extending outwardly in a radial direction from the cylindrical portion and facing the restricting surface, the flange portion being in contact with the large diameter portion; and
        an elastic body disposed in a space formed by the inner peripheral surface of the housing, the restricting surface, an outer peripheral surface of the cylindrical portion, and the flange portion, and the elastic body being formed by an elastic material, the elastic body including an outer peripheral surface having a concave recessed portion with a concavity perpendicular to the axial direction, wherein:
        in the absence of an impact force on the flange portion, the elastic body forms a gap within the concave recessed portion and adjacent to at least one of the inner peripheral surface of the housing and the outer peripheral surface of the cylindrical portion;
    in response to the large diameter portion applying the impact force on the flange portion, the elastic body is compressed between the restricting surface and the flange portion in the axial direction and is deformed towards the concave recessed portion such that the elastic body contacts the inner peripheral surface of the housing, the restricting surface, the outer peripheral surface of the cylindrical portion, and the flange portion thereby filling the gap; and
    the impact receiving member is prevented from contacting the restricting surface by the elastic body.

2. The damper device according to claim 1, wherein the elastic body includes an enlarged diameter portion having an increasing inner diameter towards the restricting surface, the enlarged diameter portion being disposed at a corner portion of an inner peripheral surface of the elastic body proximal to the restricting surface.

3. The damper device according to claim 2, wherein, in the absence of the impact force on the flange portion, and when the elastic body is in contact with the restricting surface and the flange portion, the enlarged diameter portion is (i) inclined from an end portion of the cylindrical portion towards the restricting surface, or (ii) inclined starting at a point axially between the flange portion and the end portion of the cylindrical portion and extending towards the restricting surface.

4. The damper device according to claim 1, wherein the elastic body is adhered to the flange portion and is in non-adhesive contact with the cylindrical portion, the restricting surface, and the inner peripheral surface of the housing.

5. The damper device according to claim 1, wherein:
    the housing includes a groove formed at the inner peripheral surface;
    the elastic body includes:
        a cylindrical main body portion disposed between the restricting surface and the flange portion, and
        a projection portion projecting radially outward from the cylindrical main body portion and disposed in the groove;
    the impact absorbing member includes an annular projecting protection plate embedded in the cylindrical main body portion and projecting inwardly in the radial direction relative to the projection portion;
    the cylindrical main body portion is disposed in a space formed by the inner peripheral surface of the housing, the projecting protection plate, the outer peripheral surface of the cylindrical portion, and the flange portion, an end surface of the cylindrical main body portion facing to the flange portion is adhered to the flange portion, and an inner peripheral surface of the cylindrical main body portion facing to the outer peripheral surface of the cylindrical portion is in non-adhesive contact with the outer peripheral surface of the cylindrical portion; and
    in the absence of the impact force on the flange portion, the cylindrical main body portion is disposed at least at the one of (i) the inner peripheral surface of the housing and (ii) the outer peripheral surface of the cylindrical portion with the gap.

6. The damper device according to claim 5, wherein in the absence of the impact force on the flange portion, the cylindrical portion and the projecting protection plate overlap in the axial direction.

7. The damper device according to claim 1, wherein:
    in response to the large diameter portion applying the impact force on the flange portion, the flange portion contacts the large diameter portion at an inner peripheral side area and an outer peripheral side area positioned further outwardly in the radial direction than the inner peripheral side area, and in the inner peripheral side area the flange portion does not contact with the large diameter portion, and a thickness of the outer peripheral side area is thinner than a thickness of border positions of the inner peripheral side area and the outer peripheral side area.

8. The damper device according to claim 7, wherein:
the large diameter portion and the flange portion are disposed coaxially in the axial direction;
a shape of an outer peripheral brim portion of the large diameter portion, which contacts with the flange portion, is a non-perfect circle and a shape of the border position of the inner peripheral side area and of the outer peripheral side area of the flange portion is a non-perfect circle corresponding to the non-perfect circle shape of the outer peripheral brim portion of the large diameter portion; and
the thickness of the border positions is set such that a radial position of a circumscribed circle at the border position is thinner than a radial position of an inscribed circle at the border position.

9. The damper device according to claim 1, wherein the impact absorbing member is adhered to an entire periphery of the outer peripheral surface of the flange portion, the impact absorbing member having a gap in the radial direction relative to the inner peripheral surface of the housing and having an elastic film.

10. The damper device according to claim 9, wherein:
the outer peripheral surface of the flange portion at the restricting surface side includes a corner portion having a diameter reduced towards the restricting surface;
the elastic body is adhered to the flange portion; and
the elastic film is integrally formed with the elastic body.

11. A steering device provided with the damper device according to claim 1, the steering device including:
a housing configured to accommodate the shaft, wherein:
the shaft is a rack shaft connected to steered wheels via tie rods at both ends of the rack shaft, the rack shaft being reciprocally movable in the axial direction to turn the steered wheels, and
the large diameter portion includes a set of large diameter portions disposed at two ends of the rack shaft and to which the tie rods are pivotally connected.

12. The steering device according to claim 11, further comprising an enlarged diameter portion having an increasing diameter towards the restricting surface, the enlarged diameter portion at a corner portion of an inner peripheral surface of the elastic body at a restricting surface side of the elastic body.

13. The steering device according to claim 12, wherein, in the absence of the impact force on the flange portion and when the elastic body maintains contact with the restricting surface and the flange portion, the enlarged diameter portion is inclined either (i) from an end portion of the cylindrical portion towards the restricting surface, or (ii) from a position further flange portion side from the end portion of the cylindrical portion towards the restricting surface.

14. The steering device according to claim 11, wherein the elastic body is adhered to the flange portion and in non-adhesive contact with the cylindrical portion, the restricting surface, and the inner peripheral surface of the housing.

15. The steering device according to claim 11, wherein:
the housing includes a groove formed at the inner peripheral surface;
the elastic body includes a cylindrical main body portion disposed between the restricting surface and the flange portion, and a projection portion projecting radially outward from the cylindrical main body portion and disposed in the groove;
the impact absorbing member includes an annular projecting protection plate embedded in the cylindrical main body portion, the impact absorbing member being disposed radially inward relative to the projection portion;
the cylindrical main body portion is disposed in a space formed by the inner peripheral surface of the housing, the projecting protection plate, the outer peripheral surface of the cylindrical portion, and the flange portion;
an end surface of the cylindrical main body portion facing the flange portion is adhered to the flange portion;
an inner peripheral surface of the cylindrical main body portion facing the outer peripheral surface of the cylindrical portion is in non-adhesive contact with the outer peripheral surface of the cylindrical portion; and
in the absence of the impact force on the flange portion, the cylindrical main body portion is disposed at least at the one of the inner peripheral surface of the housing and the outer peripheral surface of the cylindrical portion with the gap.

16. The steering device according to claim 15, wherein in the absence of the impact force on the flange portion, the cylindrical portion and the projecting protection plate overlap in the axial direction.

17. The steering device according to claim 11, wherein:
in response to the large diameter portion applying the impact force on the flange portion, the flange portion contacts the large diameter portion at an inner peripheral side area and the flange portion does not contact the large diameter portion at an outer peripheral side area positioned radially outward from an inner peripheral side area; and
a thickness of the outer peripheral side is thinner than a thickness of a border position of the inner peripheral side area and of the outer peripheral side area.

18. The steering device according to claim 17, wherein:
the large diameter portion and the flange portion are disposed coaxially in the axial direction;
a shape of an outer peripheral brim portion of the large diameter portion, which contacts with the flange portion, is a non-perfect circle and a shape of the border position of the inner peripheral side area and of the outer peripheral side area of the flange portion is a non-perfect circle corresponding to the non-perfect circle shape of the outer peripheral brim portion of the large diameter portion; and
the thickness of the border position is set such that a radial position of a circumscribed circle at the border position is thinner than a radial position of an inscribed circle at the border position.

19. The steering device according to claim 11, wherein the impact absorbing member is adhered to an entire periphery of the outer peripheral surface of the flange portion, the impact absorbing member having a gap in a radial direction relative to the inner peripheral surface of the housing and having an elastic film.

20. The steering device according to claim 19, wherein:
the outer peripheral surface of the flange portion at the restricting surface side includes a corner portion having a diameter reduced towards the restricting surface;
the elastic body is adhered to the flange portion; and
the elastic film is integrally formed with the elastic body.

* * * * *